(12) United States Patent
Iwasaki et al.

(10) Patent No.: US 12,554,053 B2
(45) Date of Patent: *Feb. 17, 2026

(54) OPTICALLY ANISOTROPIC LAYER, OPTICAL FILM, POLARIZING PLATE, AND IMAGE DISPLAY DEVICE

(71) Applicant: FUJIFILM Corporation, Tokyo (JP)

(72) Inventors: Tatsuya Iwasaki, Kanagawa (JP); Toshikazu Sumi, Kanagawa (JP); Shunya Katoh, Kanagawa (JP); Hiroshi Inada, Kanagawa (JP); Yuki Fukushima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 17/701,145

(22) Filed: Mar. 22, 2022

(65) Prior Publication Data

US 2022/0214484 A1    Jul. 7, 2022

Related U.S. Application Data

(63) Continuation of application No. PCT/JP2020/036210, filed on Sep. 25, 2020.

(30) Foreign Application Priority Data

Sep. 27, 2019 (JP) .................................. 2019-177910
Apr. 23, 2020 (JP) .................................. 2020-076637

(51) Int. Cl.
| | |
|---|---|
| G02F 1/1333 | (2006.01) |
| C09K 19/38 | (2006.01) |
| G02B 5/30 | (2006.01) |
| G02F 1/1335 | (2006.01) |
| H10K 59/80 | (2023.01) |

(52) U.S. Cl.
CPC ........ G02B 5/3016 (2013.01); C09K 19/3861 (2013.01); *G02F 1/133528* (2013.01); *H10K 59/8791* (2023.02)

(58) Field of Classification Search
CPC ............ C09K 19/3003; C09K 19/3804; C09K 19/0403; C09K 19/12; C09K 19/2007; C09K 19/3068; C09K 2019/0444; C09K 2019/0448; G02F 1/1333; G02F 1/133528; G02F 1/13706
See application file for complete search history.

(56) References Cited

U.S. PATENT DOCUMENTS

| | | | |
|---|---|---|---|
| 6,466,297 B1 | 10/2002 | Goulding et al. | |
| 10,473,820 B2 * | 11/2019 | Yamamoto | ........... C09D 135/02 |
| 11,230,669 B2 * | 1/2022 | Akutagawa | ............... G09F 9/00 |
| 2018/0002459 A1 | 1/2018 | Endo et al. | |
| 2019/0219753 A1 | 7/2019 | Kaneiwa et al. | |
| 2020/0079885 A1 | 3/2020 | Tamura et al. | |
| 2020/0369960 A1 | 11/2020 | Muramatsu et al. | |
| 2020/0392408 A1 | 12/2020 | Shibata et al. | |
| 2022/0213384 A1 * | 7/2022 | Katoh | ..................... H05B 33/02 |
| 2022/0213385 A1 * | 7/2022 | Hoshino | ................ C09K 19/56 |
| 2022/0214484 A1 * | 7/2022 | Iwasaki | ................ G02B 5/3016 |
| 2022/0220381 A1 * | 7/2022 | Nakamura | .............. C08F 20/20 |
| 2022/0220382 A1 * | 7/2022 | Inada | .................... G02B 5/3025 |
| 2022/0228064 A1 * | 7/2022 | Suzuki | ................... H05B 33/02 |
| 2022/0267675 A1 * | 8/2022 | Sumi | .................. C09K 19/2007 |
| 2023/0037751 A1 * | 2/2023 | Moriya | ..................... G09F 9/30 |

FOREIGN PATENT DOCUMENTS

| | | |
|---|---|---|
| JP | 2017-203168 A | 11/2017 |
| WO | 2018/062110 A1 | 4/2018 |
| WO | 2018/216812 A1 | 11/2018 |
| WO | WO 2019/009255 A1 * 1/2019 | ............... C02B 5/30 |
| WO | 2019/160044 A1 | 8/2019 |
| WO | 2019/167926 A1 | 9/2019 |
| WO | 2019/172248 A1 | 9/2019 |

OTHER PUBLICATIONS

Office Action, issued by the Japanese Patent Office on Mar. 22, 2023, in connection with Japanese Patent Application No. 2021-549028.
International Search Report issued in PCT/JP2020/036210 on Dec. 8, 2020.
Written Opinion issued in PCT/JP2020/036210 on Dec. 8, 2020.
International Preliminary Report on Patentability completed by WIPO on Jul. 13, 2021 in connection with International Patent Application No. PCT/JP2020/036210.

* cited by examiner

*Primary Examiner* — Geraldina Visconti
(74) *Attorney, Agent, or Firm* — Edwards Neils LLC; Jean C. Edwards, Esq.

(57) ABSTRACT

An optical film, a polarizing plate, and an image display device, each having an optically anisotropic layer obtained by curing a polymerizable liquid crystal composition including immobilizing an alignment state of a rod-shaped liquid crystal compound (LCC) having reverse wavelength dispersibility and a monofunctional compound, in which the rod-shaped LCC has polymerizable groups $P^1$ and $P^2$, and three or more rings $B^1$ selected from the group consisting of an aromatic ring and an alicyclic ring $a_1$ atoms of the rod-shaped LCC and $a_2$ atoms of the monofunctional compound having polymerizable group $P^3$, satisfy a relationship of Expression (1): $0.2 < a_2/a_1 < 0.55$; $b_1$ of the rings $B^1$ contained in the rod-shaped LCC and a total $b_2$ of the rings $B^2$ and the aromatic rings Ar contained in the monofunctional compound satisfy a relationship of Expression (2): $b_2 = b_1 \times 0.5$ or $b_2 = (b_1+1) \times 0.5$.

17 Claims, 1 Drawing Sheet

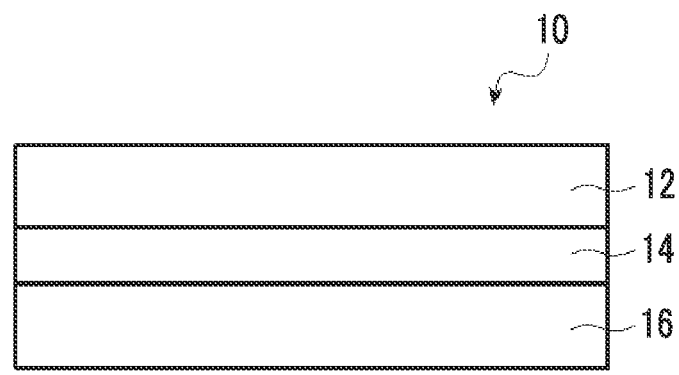

OPTICALLY ANISOTROPIC LAYER, OPTICAL FILM, POLARIZING PLATE, AND IMAGE DISPLAY DEVICE

CROSS-REFERENCE TO RELATED APPLICATIONS

This application is a Continuation of PCT International Application No. PCT/JP2020/036210 filed on Sep. 25, 2020, which was published under PCT Article 21 (2) in Japanese, and which claims priority under 35 U.S.C. § 119 (a) to Japanese Patent Application No. 2019-177910 filed on Sep. 27, 2019 and Japanese Patent Application No. 2020-076637 filed on Apr. 23, 2020. The above applications are hereby expressly incorporated by reference, in their entirety, into the present application.

BACKGROUND OF THE INVENTION

1. Field of the Invention

The present invention relates to an optically anisotropic layer, an optical film, a polarizing plate, and an image display device.

2. Description of the Related Art

Optical films such as an optical compensation sheet and a phase difference film are used in various image display devices in order to eliminate image coloration or expand a viewing angle.

A stretched birefringent film has been used as the optical film, but in recent years, it has been proposed to use an optical film having an optically anisotropic layer consisting of a liquid crystal compound instead of the stretched birefringent film.

As such an optically anisotropic layer, for example, an optically anisotropic product formed by polymerizing a polymerizable composition including a predetermined polymerizable liquid crystalline compound having one polymerizable group or two or more polymerizable groups and exhibiting reverse wavelength dispersion, and a predetermined fluorine-based surfactant is described in JP2017-203168A (claims 1 to 3, and the like).

SUMMARY OF THE INVENTION

The present inventors have conducted investigations on an optically anisotropic layer and an image display device having the optically anisotropic layer, based on JP2017-203168A, and have thus found that there is room for improvement in the contrast of the image display device.

Therefore, an object of the present invention is to provide an optically anisotropic layer with which an image display device having an excellent contrast can be manufactured; and an optical film, a polarizing plate, and an image display device, each having the optically anisotropic layer.

The present inventors have conducted intensive investigations to accomplish the object, and as a result, they have found that by curing a polymerizable liquid crystal composition including a rod-shaped liquid crystal compound having reverse wavelength dispersibility and a predetermined monofunctional compound, in which the rod-shaped liquid crystal compound and the monofunctional compound satisfy a predetermined relational expression with respect to the number of atoms and the number of rings, to form an optically anisotropic layer immobilized so that the alignment state of the rod-shaped liquid crystal compound has a periodic structure, whereby the contrast of an image display device having the optically anisotropic layer is good, and thus, the present inventors have completed the present invention.

That is, the present inventors have found that the object can be accomplished by the following configurations.

[1] An optically anisotropic layer obtained by curing a polymerizable liquid crystal composition including a rod-shaped liquid crystal compound having reverse wavelength dispersibility and a monofunctional compound, and immobilizing an alignment state of the rod-shaped liquid crystal compound, in which the rod-shaped liquid crystal compound has polymerizable groups $P^1$ and $P^2$, constituting one terminal and the other terminal of the rod-shaped liquid crystal compound, respectively, and three or more rings $B^1$ selected from the group consisting of an aromatic ring which may have a substituent and an alicyclic ring which may have a substituent, and existing on a bond that links the polymerizable groups $P^1$ and $P^2$, the monofunctional compound has a polymerizable group $P^3$ capable of being polymerized with the rod-shaped liquid crystal compound, an aromatic ring Ar which may have a substituent, and one or more rings $B^2$ selected from the group consisting of an aromatic ring which may have a substituent and an alicyclic ring which may have a substituent, and existing on a bond that links the polymerizable group $P^3$ and the aromatic ring Ar, in the monofunctional compound, the polymerizable group $P^3$ constitutes one terminal of the monofunctional compound, and the aromatic ring Ar or the substituent which may be contained in the aromatic ring Ar constitutes the other terminal of the monofunctional compound, the number $a_1$ of atoms of the rod-shaped liquid crystal compound and the number $a_2$ of atoms of the monofunctional compound satisfy a relationship of Expression (1), the number $b_1$ of the rings $B^1$ contained in the rod-shaped liquid crystal compound and a total number $b_2$ of the rings $B^2$ and the aromatic rings Ar contained in the monofunctional compound satisfy a relationship of Expression (2), and the optically anisotropic layer shows a diffraction peak derived from a periodic structure in X-ray diffraction measurement, $$0.2 < a_2/a_1 < 0.55 \qquad \text{Expression (1):}$$

$$b_2 = b_1 \times 0.5 \text{ or } b_2 = (b_1 + 1) \times 0.5. \qquad \text{Expression (2):}$$

[2] The optically anisotropic layer as described in [1], in which an array of rings consisting of the ring $B^2$ and the aromatic ring Ar arranged in order from the polymerizable group $P^3$ in the monofunctional compound is the same as an array of the rings $B^1$ arranged from the polymerizable group $P^1$ or $P^2$ in the rod-shaped liquid crystal compound.

[3] The optically anisotropic layer as described in [1] or [2], in which a structure of a portion W1 from the ring $B^2$ closest to the polymerizable group $P^3$ to a group closest to the aromatic ring Ar on the bond that links the polymerizable group $P^3$ and the aromatic ring Ar of the monofunctional compound is the same as a structure of a portion W2 from the ring $B^1$ closest to the polymerizable group $P^1$ or $P^2$ on the bond that links the polymerizable groups $P^1$ and $P^2$ of the rod-shaped liquid crystal compound.

[4] The optically anisotropic layer as described in any one of [1] to [3],
in which the rod-shaped liquid crystal compound has five rings $B^1$.

[5] The optically anisotropic layer as described in any one of [1] to [4],
in which the monofunctional compound has two rings $B^2$.

[6] The optically anisotropic layer as described in any one of [1] to [5],
in which the rod-shaped liquid crystal compound has any linking group selected from the group consisting of groups represented by Formulae (Ar-1) to (Ar-7) which will be described later.

[7] The optically anisotropic layer as described in [6],
in which the rod-shaped liquid crystal compound is a compound represented by Formula (I) which will be described later.

[8] The optically anisotropic layer as described in [7],
in which all of n1, m1, m2, and n2 are 1 in Formula (I).

[9] The optically anisotropic layer as described in [7],
in which in Formula (I), both of n1 and n2 are 0, and both of m1 and m2 are 2.

[10] The optically anisotropic layer as described in any one of [1] to [9],
in which the monofunctional compound is a compound represented by Formula (II) which will be described later.

[11] The optically anisotropic layer as described in any one of [1] to [10],
in which the rod-shaped liquid crystal compound has at least one 1,4-cyclohexylene group.

[12] The optically anisotropic layer as described in any one of [1] to [11],
in which the monofunctional compound has at least one 1,4-cyclohexylene group.

[13] The optically anisotropic layer as described in any one of [1] to [12],
in which the rod-shaped liquid crystal compound is immobilized in a state of being horizontally aligned with respect to a main surface of the optically anisotropic layer.

[14] The optically anisotropic layer as described in any one of [1] to [13],
in which the optically anisotropic layer is a positive A plate.

[15] An optical film comprising the optically anisotropic layer as described in any one of [1] to [14].

[16] The optical film as described in [15],
in which the optically anisotropic layer is formed on a surface of a photo-alignment film.

[17] A polarizing plate comprising:
the optical film as described in [15] or [16]; and
a polarizer.

[18] An image display device comprising the optical film as described in [15] or [16], or the polarizing plate as described in [17].

[19] The image display device as described in [18],
in which the image display device is a liquid crystal display device.

[20] The image display device as described in [18],
in which the image display device is an organic EL display device.

The present invention provides an optically anisotropic layer with which an image display device having an excellent contrast can be manufactured; and an optical film, a polarizing plate, and an image display device, each having the optically anisotropic layer.

BRIEF DESCRIPTION OF THE DRAWINGS

FIG. 1 is a schematic cross-sectional view showing an example of an optical film.

DESCRIPTION OF THE PREFERRED EMBODIMENTS

Hereinafter, the present invention will be described in detail.

Description of configuration requirements described below may be made on the basis of representative embodiments of the present invention in some cases, but the present invention is not limited to such embodiments.

Furthermore, in the present specification, a numerical value range expressed using "to" means a range that includes the preceding and succeeding numerical values of "to" as the lower limit value and the upper limit value, respectively.

In addition, in the present specification, only one kind of the substance corresponding to each component may be used alone or two or more kinds thereof may also be used in combination, for each component. Here, in a case where the two or more substances are used in combination for each component, the content of the component refers to a total content of the substances used in combination unless otherwise specified.

In addition, in the present specification, the bonding direction of a divalent group (for example, $-CR^3=CR^4-$) as noted is not particularly limited unless the bonding position is specified, and for example, in a case where $X^1$ in Formula (I) which will be described later is $-CR^3=CR^4-$, $X^1$ may be either *1-$CR^3=CR^4$-*2 or *1-$CR^4=CR^3$-*2, in which *1 represents a bonding position to the $Sp^1$ side and *2 represents a bonding position to the $Ar^1$ side.

[Optically Anisotropic Layer]

The optically anisotropic layer of an embodiment of the present invention is an optically anisotropic layer formed by curing a polymerizable liquid crystal composition (also simply referred to as "the present composition") including a rod-shaped liquid crystal compound having reverse wavelength dispersibility (hereinafter also simply referred to as a "rod-shaped liquid crystal compound") and a monofunctional compound, and immobilizing the alignment state of the rod-shaped liquid crystal compound.

In addition, in the present invention, the rod-shaped liquid crystal compound has polymerizable groups $P^1$ and $P^2$, constituting one terminal and the other terminal of the rod-shaped liquid crystal compound, respectively, and three or more rings $B^1$ selected from the group consisting of an aromatic ring which may have a substituent and an alicyclic ring which may have a substituent, and existing on a bond that links the polymerizable groups $P^1$ and $P^2$.

Furthermore, in the present invention, the monofunctional compound has a polymerizable group $P^3$ capable of being polymerized with the rod-shaped liquid crystal compound, an aromatic ring Ar which may have a substituent, and one or more rings $B^2$ selected from the group consisting of an aromatic ring and an alicyclic ring, and existing on a bond that links the polymerizable group $P^3$ and the aromatic ring Ar.

Moreover, in the monofunctional compound, the polymerizable group $P^3$ constitutes one terminal of the monofunctional compound, and the aromatic ring Ar or the substituent which may be contained in the aromatic ring Ar constitutes the other terminal of the monofunctional compound.

Furthermore, in the present invention, the number $a_1$ of atoms of the rod-shaped liquid crystal compound and the number $a_2$ of atoms of the monofunctional compound satisfy a relationship of Expression (1).

$$0.2 < a_2/a_1 < 0.55 \qquad \text{Expression (1):}$$

The number $a_1$ of atoms of the rod-shaped liquid crystal compound represents the number of atoms on a bond that links one terminal and the other terminal of the rod-shaped liquid crystal compound at the shortest distance, and hydrogen atoms are not included.

In addition, the number $a_2$ of atoms of the monofunctional compound represents the number of atoms on a bond that links one terminal and the other terminal of the monofunctional compound at the shortest distance, and hydrogen atoms are not included.

Here, one terminal and the other terminal of the compound mean a starting atom and an ending atom, respectively, for which a maximum number of atoms is calculated in a case where the atoms on a bond of the compound are linked at the shortest distance.

Incidentally, in a case where the number of atoms on the bond is counted, the starting atom and the ending atom are also counted.

Therefore, one and the other of the starting atom and the ending atom in the calculation of the number $a_1$ of atoms of the rod-shaped liquid crystal compound are included in the polymerizable group $P^1$ and the polymerizable group $P^2$, respectively. In addition, one and the other of the starting atom and the ending atom in the calculation of the number $a_2$ of atoms of the monofunctional compound are included in the polymerizable group $P^3$ of the monofunctional compound and either the aromatic ring Ar which may have a substituent or the substituent.

For example, since the number $a_1$ of atoms of the following rod-shaped liquid crystal compound R3 which is an example of the rod-shaped liquid crystal compound is "50", the number $a_2$ of atoms of the following monofunctional compound A1 which is an example of the monofunctional compound is "22", and "$a_2/a_1$" is calculated as 0.44, the rod-shaped liquid crystal compound R3 and the monofunctional compound A1 satisfy a relationship of Expression (1).

contained in the monofunctional compound satisfy a relationship of Expression (2).

$$b_2 = b_1 \times 0.5 \text{ or } b_2 = (b_1+1) \times 0.5 \qquad \text{Expression (2):}$$

For example, since the number of the rings $B^1$ contained in the rod-shaped liquid crystal compound R3 is "5" and the total number of the rings $B^2$ and the rings Ar of the monofunctional compound A1 is "3", the rod-shaped liquid crystal compound R3 and the monofunctional compound A1 satisfy a relationship of Expression (2).

Furthermore, the optically anisotropic layer of the embodiment of the present invention shows a diffraction peak derived from a periodic structure in X-ray diffraction measurement.

Incidentally, in a case where the present composition includes two or more kinds of rod-shaped liquid crystal compounds and/or a case where the present composition includes two or more kinds of monofunctional compounds, at least one rod-shaped liquid crystal compound and at least one monofunctional compound only need to satisfy a relationship of Expressions (1) and (2).

In the present invention, by forming an optically anisotropic layer having a periodic structure, using a polymerizable liquid crystal composition in which the number $a_1$ of atoms of the rod-shaped liquid crystal compound and the number $a_2$ of atoms of the monofunctional compound satisfy the relationship of Expression (1), and the number $b_1$ of the rings B1 contained in the rod-shaped liquid crystal compound and the total number $b_2$ of the rings $B^2$ and the rings Ar contained in the monofunctional compound satisfy the relationship of Expression (2), the contrast of an image display device having the optically anisotropic layer is good.

A reason therefor is not specifically clear, but is presumed to be as follows by the present inventors.

That is, it is considered that by satisfying the relationship of Expressions (1) and (2), the monofunctional compound enters between the molecules of the rod-shaped liquid crystal compound and the alignment defects generated by curing shrinkage upon immobilization of the alignment state are suppressed without disturbing the alignment state of the rod-shaped liquid crystal compound, and as a result, the contrast of an image display device having the optically anisotropic layer is good.

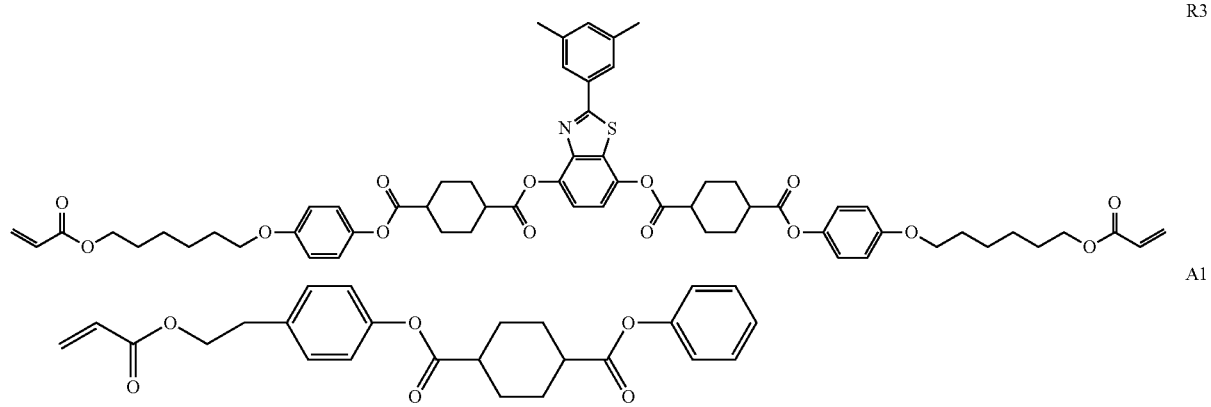

R3

A1

Moreover, in the present invention, the number $b_1$ of the rings $B^1$ contained in the rod-shaped liquid crystal compound and a total number $b_2$ of the rings $B^2$ and the rings Ar In the rod-shaped liquid crystal compound and the monofunctional compound included in the present composition, it is preferable that the number at of atoms of the rod-shaped liquid crystal compound and the number $a_2$ of atoms of the monofunctional compound satisfy a relationship of Expression (1a) from the viewpoint of maintaining the alignment properties of the liquid crystal compound and suppressing the generation of alignment defects due to curing shrinkage.

$0.35<a_2/a_1<0.50$    Expression (1a):

[Polymerizable Liquid Crystal Composition]

The present composition includes at least a rod-shaped liquid crystal compound and a monofunctional compound which satisfy the relationships of Expression (1) and Expression (2).

Hereinafter, the respective components of the present composition will be described in detail.

<Rod-Shaped Liquid Crystal Compound>

The rod-shaped liquid crystal compound included in the present composition is not particularly limited as long as it is a rod-shaped liquid crystal compound having reverse wavelength dispersibility and having two polymerizable groups $P^1$ and $P^2$, and three or more rings $B^1$ selected from the group consisting of an aromatic ring and an alicyclic ring, and existing on a bond that links the polymerizable groups $P^1$ and $P^2$.

Incidentally, the two polymerizable groups $P^1$ and $P^2$ of the rod-shaped liquid crystal compound may be the same as or different from each other, and the three or more rings B1 of the rod-shaped liquid crystal compound may be the same as or different from each other.

In addition, the rod-shaped liquid crystal compound has reverse wavelength dispersion. Since the rod-shaped liquid crystal compound has the reverse wavelength dispersion, the optical compensability of an optically anisotropic layer can be improved.

In the present specification, the "rod-shaped liquid crystal compound having reverse wavelength dispersibility" means that in a case where an in-plane retardation (Re) value at a specific wavelength (visible light range) of a phase difference film manufactured using the polymerizable liquid crystal compound is measured, the Re value is equal or higher as a measurement wavelength is increased.

The polymerizable groups $P^1$ and $P^2$ contained in the rod-shaped liquid crystal compound are not particularly limited, but are each preferably a polymerizable group which is radically polymerizable or cationically polymerizable.

A known radically polymerizable group can be used as the radically polymerizable group, and suitable examples thereof include an acryloyloxy group and a methacryloyloxy group. In this case, it is known that the acryloyloxy group tends to have a higher polymerization rate, and from the viewpoint of improvement of productivity, the acryloyloxy group is preferable but the methacryloyloxy group can also be used as the polymerizable group.

A known cationically polymerizable group can be used as the cationically polymerizable group, and specific examples thereof include an alicyclic ether group, a cyclic acetal group, a cyclic lactone group, a cyclic thioether group, a spiroorthoester group, and a vinyloxy group. Among those, the alicyclic ether group or the vinyloxy group is preferable, and an epoxy group, an oxetanyl group, or the vinyloxy group is more preferable.

Particularly preferred examples of the polymerizable groups include a polymerizable group represented by any of Formulae (P-1) to (P-20).

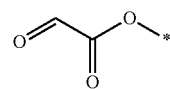 (P-1)

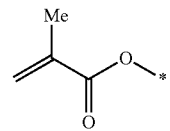 (P-2)

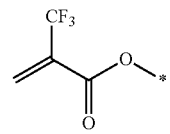 (P-3)

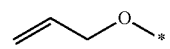 (P-4)

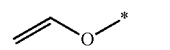 (P-5)

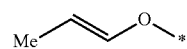 (P-6)

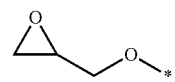 (P-7)

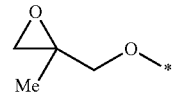 (P-8)

 (P-9)

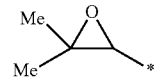 (P-10)

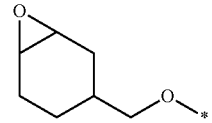 (P-11)

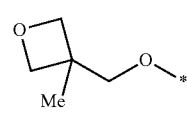 (P-12)

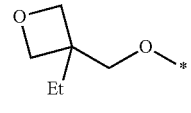 (P-13)

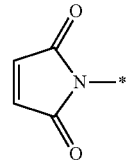 (P-14)

 (P-15)

(P-16) 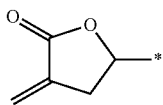

(P-17) 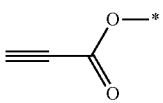

(P-18) 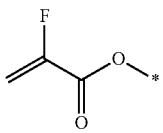

(P-19) 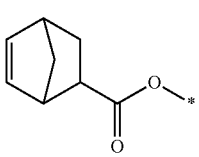

(P-20) 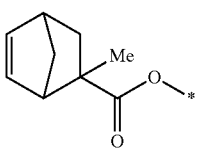

The rod-shaped liquid crystal compound may have three or more polymerizable groups. In a case where the rod-shaped liquid crystal compound has three or more polymerizable groups, the polymerizable group other than the above-mentioned polymerizable groups $P^1$ and $P^2$ is not particularly limited, and examples of the polymerizable group, including suitable aspects thereof, include the same ones as the radically polymerizable group or the cationically polymerizable group.

The rod-shaped liquid crystal compound has three or more rings $B^1$ selected from the group consisting of an aromatic ring which may have a substituent and an alicyclic ring which may have a substituent, and existing on a bond that links the polymerizable groups $P^1$ and $P^2$.

Here, the expression of the ring $B^1$ "existing on a bond that links the polymerizable groups $P^1$ and $P^2$" means that the ring $B^1$ constitutes a part of a portion necessary for directly linking the polymerizable groups $P^1$ and $P^2$.

The rod-shaped liquid crystal compound may have a portion other than the portion necessary for directly linking the polymerizable groups $P^1$ and $P^2$, but the ring structure constituting a part of the portion is not included in the ring $B^1$.

Examples of the aromatic ring which may have a substituent, which is one aspect of the ring $B^1$, include an aromatic ring having 5 to 20 ring members, which may have a substituent.

Examples of the aromatic ring having 5 to 20 ring members include an aromatic hydrocarbon ring such as a benzene ring, a naphthalene ring, an anthracene ring, and a phenanthrene ring; and an aromatic heterocyclic ring such as a furan ring, a pyrrole ring, a thiophene ring, a pyridine ring, a thiazole ring, and a benzothiazole ring, and among these, the benzene ring (for example, a 1,4-phenyl group) is preferable.

In addition, it is also preferable that the rod-shaped liquid crystal compound has any of the groups represented by Formulae (Ar-1) to (Ar-7) which will be described later as the ring $B^1$.

Examples of the alicyclic ring which may have a substituent, which is one aspect of the ring $B^1$, include a divalent alicyclic hydrocarbon group having 5 to 20 carbon atoms, which may have a substituent, and a heterocyclic ring in which one or more of —$CH_2$—'s constituting a divalent alicyclic hydrocarbon group having 5 to 20 carbon atoms are substituted with —O—, —S—, or —NH—.

As the divalent alicyclic hydrocarbon group having 5 to 20 carbon atoms, a 5-membered ring or a 6-membered ring is preferable. In addition, the alicyclic hydrocarbon group may be saturated or unsaturated, but is preferably the saturated alicyclic hydrocarbon group. With regard to the divalent alicyclic hydrocarbon group, reference can be made to, for example, the description in paragraph [0078] of JP2012-021068A, the contents of which are hereby incorporated by reference.

As the alicyclic ring which is one aspect of the ring $B^1$, a cycloalkane ring having 5 to 20 carbon atoms is preferable. Examples of the cycloalkane ring having 5 to 20 carbon atoms include a cyclohexane ring, a cyclopeptane ring, a cyclooctane ring, a cyclododecane ring, and a cyclodocosane ring. Among those, the cyclohexane ring is preferable, a 1,4-cyclohexylene group is more preferable, and a trans-1,4-cyclohexylene group is still more preferable.

The rod-shaped liquid crystal compound preferably has at least one cyclohexane ring, more preferably has at least one 1,4-cyclohexylene group, and still more preferably has at least one trans-1,4-cyclohexylene group, as the ring $B^1$.

Examples of the substituent which may be contained in the aromatic ring or the alicyclic ring which is one aspect of the ring $B^1$ include an alkyl group, an alkoxy group, an alkylcarbonyl group, an alkoxycarbonyl group, an alkylcarbonyloxy group, an alkylamino group, a dialkylamino group, an alkylamide group, an alkenyl group, an alkynyl group, a halogen atom, a cyano group, a nitro group, an alkylthiol group, and an N-alkylcarbamate group.

Among those, the alkyl group, the alkoxy group, the alkoxycarbonyl group, the alkylcarbonyloxy group, or the halogen atom is preferable.

As the alkyl group, a linear, branched, or cyclic alkyl group having 1 to 18 carbon atoms is preferable, an alkyl group having 1 to 8 carbon atoms (for example, a methyl group, an ethyl group, a propyl group, an isopropyl group, an n-butyl group, an isobutyl group, a sec-butyl group, a t-butyl group, and a cyclohexyl group) is more preferable, an alkyl group having 1 to 4 carbon atoms is still more preferable, and the methyl group or the ethyl group is particularly preferable.

As the alkoxy group, an alkoxy group having 1 to 18 carbon atoms is preferable, an alkoxy group having 1 to 8 carbon atoms (for example, a methoxy group, an ethoxy group, an n-butoxy group, and a methoxyethoxy group) is more preferable, an alkoxy group having 1 to 4 carbon atoms is still more preferable, and the methoxy group or the ethoxy group is particularly preferable.

Examples of the alkoxycarbonyl group include a group in which an oxycarbonyl group (—O—CO— group) is bonded to the alkyl group exemplified above, and for example, the alkoxycarbonyl group is preferably a methoxycarbonyl group, an ethoxycarbonyl group, an n-propoxycarbonyl group, or an isopropoxycarbonyl group, and more preferably the methoxycarbonyl group.

Examples of the alkylcarbonyloxy group include a group in which a carbonyloxy group (—CO—O— group) is bonded to the alkyl group, and for example, a methylcarbonyloxy group, an ethylcarbonyloxy group, an n-propylcarbonyloxy group, or an isopropylcarbonyloxy group is preferable, and the methylcarbonyloxy group is more preferable.

Examples of the halogen atom include a fluorine atom, a chlorine atom, a bromine atom, and an iodine atom, and the fluorine atom or the chlorine atom is preferable.

In the rod-shaped liquid crystal compound, the number of the rings $B^1$ existing on a bond that links the polymerizable groups $P^1$ and $P^2$ is not particularly limited, but from the viewpoint of the alignment stability of the liquid crystal compound, the number of the rings $B^1$ is preferably 3 to 7, more preferably 4 to 6, and still more preferably 5.

The rod-shaped liquid crystal compound preferably has any of the groups represented by Formulae (Ar-1) to (Ar-7) from the viewpoint that the optical compensability of an optically anisotropic layer is further improved.

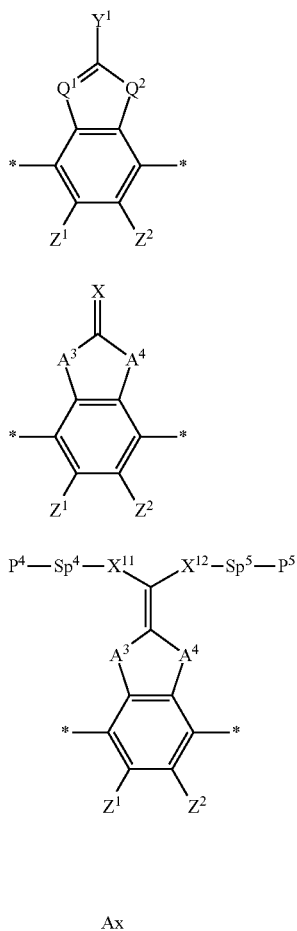

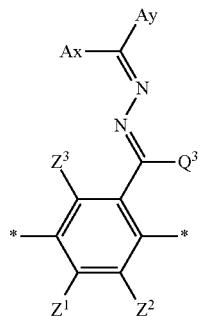

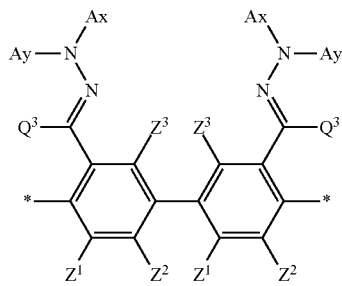

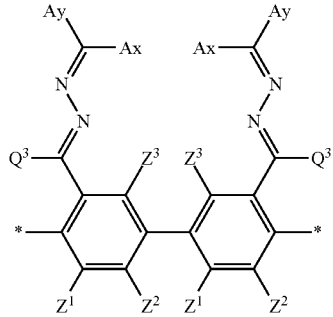

In Formulae (Ar-1) to (Ar-7), * represents a bonding position, that is, a bonding position to a portion other than the aromatic ring included in the rod-shaped liquid crystal compound.

In addition, in Formula (Ar-1), $Q^1$ represents N or CH, $Q^2$ represents —S—, —O—, or —N($R^6$)—, $R^6$ represents a hydrogen atom or an alkyl group having 1 to 6 carbon atoms, $Y^1$ represents an aromatic hydrocarbon group having 6 to 12 carbon atoms, which may have a substituent, an aromatic heterocyclic group having 3 to 12 carbon atoms, which may have a substituent, or an alicyclic hydrocarbon group having 6 to 20 carbon atoms, which may have a substituent, and one or more of —$CH_2$—'s constituting the alicyclic hydrocarbon group may be substituted with —O—, —S—, or —NH—.

Here, examples of the alkyl group having 1 to 6 carbon atoms, represented by $R^6$, include a methyl group, an ethyl group, a propyl group, an isopropyl group, an n-butyl group, an isobutyl group, a sec-butyl group, a tert-butyl group, an n-pentyl group, and an n-hexyl group.

In addition, examples of the aromatic hydrocarbon group having 6 to 12 carbon atoms, represented by $Y^1$, include aryl groups such as a phenyl group, a 2,6-diethylphenyl group, and a naphthyl group.

Examples of the aromatic heterocyclic group having 3 to 12 carbon atoms represented by $Y^1$ include heteroaryl groups such as a thienyl group, a thiazolyl group, a furyl group, and a pyridyl group.

Examples of the alicyclic hydrocarbon group having 6 to 20 carbon atoms, represented by $Y^1$, include a cyclohexylene group, a cyclopentylene group, a norbornene group, and an adamantylene group.

Examples of the substituent which may be contained in $Y^1$, including suitable aspects thereof, include the same ones as the substituents which may be contained in the aromatic ring or the alicyclic ring which is one aspect of the ring $B^1$.

In addition, in Formulae (Ar-1) to (Ar-7), $Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a monovalent aromatic heterocyclic group having 3 to 20 carbon atoms, a halogen atom, a cyano group, a nitro group, —$OR^7$, —$NR^8R^9$, —$SR^{10}$, —$COOR^{11}$, or —$COR^{12}$, where $R^7$ to $R^{12}$ each independently represent a hydrogen atom or an alkyl group having 1 to 6 carbon atoms, and $Z^1$ and $Z^2$ may be bonded to each other to form an aromatic ring.

Here, as the monovalent aliphatic hydrocarbon group having 1 to 20 carbon atoms, an alkyl group having 1 to 15 carbon atoms is preferable, an alkyl group having 1 to 8 carbon atoms is more preferable, a methyl group, an ethyl group, an isopropyl group, a tert-pentyl group (1,1-dimethylpropyl group), a tert-butyl group, or a 1,1-dimethyl-3,3-dimethyl-butyl group is still more preferable, and the methyl group, the ethyl group, or the tert-butyl group is particularly preferable.

Examples of the monovalent alicyclic hydrocarbon group having 3 to 20 carbon atoms include monocyclic saturated hydrocarbon groups such as a cyclopropyl group, a cyclobutyl group, a cyclopentyl group, a cyclohexyl group, a cycloheptyl group, a cyclooctyl group, a cyclodecyl group, a methylcyclohexyl group, and an ethylcyclohexyl group; monocyclic unsaturated hydrocarbon groups such as a cyclobutenyl group, a cyclopentenyl group, a cyclohexenyl group, a cycloheptenyl group, a cyclooctenyl group, a cyclodecenyl group, a cyclopentadienyl group, a cyclohexadienyl group, a cyclooctadienyl group, and a cyclodecadiene; and polycyclic saturated hydrocarbon groups such as a bicyclo[2.2.1]heptyl group, a bicyclo[2.2.2]octyl group, a tricyclo[5.2.1.0$^{2,6}$]decyl group, a tricyclo[3.3.1.1$^{3,7}$]decyl group, a tetracyclo[6.2.1.1$^{3,6}$.0$^{2,7}$]dodecyl group, and an adamantyl group.

Examples of the monovalent aromatic hydrocarbon group having 6 to 20 carbon atoms include a phenyl group, a 2,6-diethylphenyl group, a naphthyl group, and a biphenyl group; an aryl group having 6 to 12 carbon atoms is preferable, and a phenyl group is more preferable.

Examples of the monovalent aromatic heterocyclic group having 3 to 20 carbon atoms include a 4-pyridyl group, a 2-furyl group, a 2-thienyl group, a 2-pyrimidinyl group, and a 2-benzothiazolyl group.

Examples of the halogen atom include a fluorine atom, a chlorine atom, a bromine atom, and an iodine atom, and among these, the fluorine atom, the chlorine atom, or the bromine atom is preferable.

On the other hand, examples of the alkyl group having 1 to 6 carbon atoms, represented by each of $R^7$ to $R^{12}$, include a methyl group, an ethyl group, a propyl group, an isopropyl group, an n-butyl group, an isobutyl group, a sec-butyl group, a tert-butyl group, an n-pentyl group, and an n-hexyl group.

In addition, $Z^1$ and $Z^2$ may be bonded to each other to form an aromatic ring, as mentioned above. Examples of the structure in a case where $Z^1$ and $Z^2$ in Formula (Ar-1) are bonded to each other form an aromatic ring include a group represented by Formula (Ar-1a). Furthermore, in Formula (Ar-1a), * represents a bonding position, and examples of $Q^1$, $Q^2$, and $Y^1$, including suitable aspects thereof, include the same ones as those described in Formula (Ar-1).

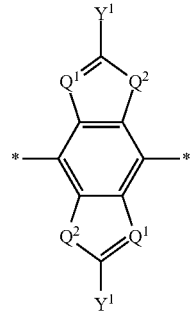

(Ar-1a)

In addition, in Formula (Ar-2), $A^3$ and $A^4$ each independently represent a group selected from the group consisting of —O—, —N($R^{13}$)—, —S—, and —CO—, and $R^{13}$ represents a hydrogen atom or a substituent.

Examples of the substituent represented by $R^{13}$, including suitable aspects thereof, include the same ones as the substituents which may be contained in the aromatic ring or the alicyclic ring which is one aspect of the ring $B^1$.

In addition, in Formula (Ar-2), X represents a hydrogen atom or a non-metal atom of Groups XIV to XVI, to which a substituent may be bonded.

Furthermore, examples of the non-metal atom of Groups XIV to XVI represented by X include an oxygen atom, a sulfur atom, a nitrogen atom to which a hydrogen atom or a substituent is bonded [=N—$R^{N1}$, $R^{N1}$ represents a hydrogen atom or a substituent], and a carbon atom to which a hydrogen atom or a substituent is bonded [=C—($R^{C1}$)$_2$, $R^{C1}$ represents a hydrogen atom or a substituent].

Examples of the substituent include an alkyl group, an alkoxy group, an alkyl-substituted alkoxy group, a cyclic alkyl group, an aryl group (for example, a phenyl group and a naphthyl group), a cyano group, an amino group, a nitro group, an alkylcarbonyl group, a sulfo group, and a hydroxyl group.

In addition, in Formula (Ar-3), $X^{11}$ and $X^{12}$ each independently represent a single bond; or —CO—, —O—, —S—, —C(=S)—, —$CR^1R^2$—, —$CR^3$=$CR^4$—, —$NR^5$—, or a divalent linking group consisting of a combination of two or more of these groups, where $R^1$ to $R^5$ each independently represent a hydrogen atom, a fluorine atom, or an alkyl group having 1 to 12 carbon atoms.

Here, examples of the divalent linking group represented by one aspect of $X^{11}$ and $X^{12}$ include —CO—, —O—, —CO—O—, —C(=S)O—, —$CR^1R^2$—, —$CR^1R^2$—$CR^1R^2$—, —O—$CR^1R^2$—, —$CR^1R^2$—O—$CR^1R^2$—, —CO—O—$CR^1R^2$—, —O—CO—$CR^1R^2$—, —$CR^1R^2$—O—CO—$CR^1R^2$—, —$CR^1R^2$—CO—O—$CR^1R^2$—, —$NR^5$—$CR^1R^2$—, and —CO—$NR^5$—. $R^1$, $R^2$, and $R^5$ each independently represent a hydrogen atom, a fluorine atom, or an alkyl group having 1 to 12 carbon atoms.

Among those, any of —CO—, —O—, and —CO—O— is preferable.

Moreover, in Formula (Ar-3), $Sp^4$ and $Sp^5$ each independently represent a single bond, a linear or branched alkylene group having 1 to 14 carbon atoms, or a divalent linking group in which one or more of —$CH_2$—'s constituting the linear or branched alkylene group having 1 to 14 carbon atoms are substituted with —O—, —S—, —NH—, —N(Q)-, or —CO—, where Q represents a substituent.

Here, examples of the linear or branched alkylene group having 1 to 14 carbon atoms, represented by one aspect of $Sp^4$ and $Sp^5$, include a methylene group, an ethylene group, a propylene group, a butylene group, a pentylene group, a hexylene group, a methylhexylene group, and a heptylene group. Furthermore, as mentioned above, $Sp^4$ and $Sp^5$ may each be a divalent linking group in which one or more of —$CH_2$—'s constituting these alkylene groups are substituted with —O—, —S—, —NH—, —N(Q)-, or —CO—.

Examples of the substituent represented by Q, including suitable aspects thereof, include the same ones as the substituents which may be contained in the aromatic ring or the alicyclic ring which is one aspect of the ring $B^1$.

In addition, in Formula (Ar-3), $P^4$ and $P^5$ each independently represent a monovalent organic group, and at least one of $P^4$ or $P^5$ represents a polymerizable group.

Here, examples of the monovalent organic group represented by each of $P^4$ and $P^5$ include an alkyl group, an aryl group, and a heteroaryl group. The alkyl group may be linear, branched, or cyclic, but is preferably linear. The alkyl group preferably has 1 to 10 carbon atoms. In addition, the aryl group may be a monocycle or a polycycle, but is preferably the monocycle. The number of carbon atoms of the aryl group is preferably 6 to 25, and more preferably 6 to 10. Further, the heteroaryl group may be a monocycle or a polycycle. The number of heteroatoms constituting the heteroaryl group is preferably 1 to 3. The heteroatoms constituting the heteroaryl group are preferably a nitrogen atom, a sulfur atom, or an oxygen atom. The number of carbon atoms of the heteroaryl group is preferably 6 to 18, and more preferably 6 to 12.

In addition, the alkyl group, the aryl group, and the heteroaryl group may be unsubstituted or have a substituent. Examples of the substituent, including suitable aspects thereof, include the same ones as the substituents which may be contained in the aromatic ring or the alicyclic ring which is one aspect of the ring B.

In addition, examples of the polymerizable group represented by at least one of $P^4$ or $P^5$ include the same ones as the above-mentioned polymerizable groups which are radically polymerizable or cationically polymerizable, and among these, suitable examples thereof include the polymerizable groups represented by any of Formulae (P-1) to (P-20) mentioned above.

Moreover, in Formulae (Ar-4) to (Ar-7), Ax represents an organic group having 2 to 30 carbon atoms, which has at least one aromatic ring selected from the group consisting of an aromatic hydrocarbon ring and an aromatic heterocyclic ring.

Furthermore, in Formulae (Ar-4) to (Ar-7), Ay represents a hydrogen atom, an alkyl group having 1 to 12 carbon atoms, which may have a substituent, or an organic group having 2 to 30 carbon atoms, which has at least one aromatic ring selected from the group consisting of an aromatic hydrocarbon ring and an aromatic heterocyclic ring.

Here, the aromatic ring in each of Ax and Ay may have a substituent, and Ax and Ay may be bonded to each other to form a ring.

In addition, $Q^3$ represents a hydrogen atom or an alkyl group having 1 to 6 carbon atoms, which may have a substituent.

Examples of each of Ax and Ay include the ones described in paragraphs [0039] to [0095] of WO2014/010325A.

Incidentally, examples of the alkyl group having 1 to 6 carbon atoms, represented by $Q^3$, include a methyl group, an ethyl group, a propyl group, an isopropyl group, an n-butyl group, an isobutyl group, a sec-butyl group, a tert-butyl group, an n-pentyl group, and an n-hexyl group, and examples of the substituent, including suitable aspects thereof, include the same ones as the substituents which may be contained in the aromatic ring or the alicyclic ring which is one aspect of the ring $B^1$.

The rod-shaped liquid crystal compound is preferably a compound represented by Formula (I) for a reason that the optical compensability is further improved.

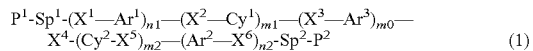

$$P^1\text{-}Sp^1\text{-}(X^1\text{—}Ar^1)_{n1}\text{—}(X^2\text{—}Cy^1)_{m1}\text{—}(X^3\text{—}Ar^3)_{m0}\text{—}X^4\text{-}(Cy^2\text{-}X^5)_{m2}\text{—}(Ar^2\text{—}X^6)_{n2}\text{-}Sp^2\text{-}P^2 \quad (1)$$

In Formula (I), $P^1$ and $P^2$ each independently represent a polymerizable group.

$Sp^1$ and $Sp^2$ each independently represent a single bond, a linear or branched alkylene group having 1 to 14 carbon atoms, or a divalent linking group in which one or more of —$CH_2$—'s constituting the linear or branched alkylene group having 1 to 14 carbon atoms are substituted with —O—, —S—, —NH—, —N(Q)-, or —CO—, where Q represents a substituent.

n1, m1, m2, and n2 represent an integer from 0 to 2. It should be noted that at least one of m1 or n1 represents 1 or more, and at least one of m2 or n2 represents 1 or more.

m0 represents 1 or 2.

$X^1$, $X^2$, $X^3$, $X^4$, $X^5$, and $X^6$ each independently represent a single bond; or —CO—, —O—, —S—, —C(=S)—, —$CR^1R^2$—, —$CR^3$=$CR^4$—, —$NR^5$—, or a divalent linking group consisting of a combination of two or more of these groups, where $R^1$ to $R^5$ each independently represent a hydrogen atom, a fluorine atom, or an alkyl group having 1 to 12 carbon atoms. It should be noted that in a case where n1 is 2, a plurality of $X^1$'s may be the same as or different from each other; in a case where m1 is 2, a plurality of $X^2$'s may be the same as or different from each other; in a case where m2 is 2, a plurality of $X^5$'s may be the same as or different from each other; and in a case where n2 is 2, a plurality of $X^6$'s may be the same as or different from each other.

$Ar^1$ and $Ar^2$ each independently represent an aromatic ring which may have a substituent. It should be noted that in a case where n1 is 2, a plurality of $Ar^1$'s may be the same as or different from each other; and in a case where n2 is 2, a plurality of $Ar^2$'s may be the same as or different from each other.

$Cy^1$ and $Cy^2$ each independently represent an alicyclic ring which may have a substituent. It should be noted that in a case where m1 is 2, a plurality of $Cy^1$'s may be the same as or different from each other; and in a case where m2 is 2, a plurality of $Cy^2$'s may be the same as or different from each other.

$Ar^3$ represents any of aromatic rings selected from the group consisting of the above-mentioned groups represented by Formulae (Ar-1) to (Ar-7).

In Formula (I), examples of the polymerizable group represented by each of $P^1$ and $P^2$ include the same ones as the above-mentioned polymerizable groups which are radically polymerizable or cationically polymerizable; and among these, the above-mentioned polymerizable groups represented by any of Formulae (P-1) to (P-20) are preferable, and the acryloyloxy group or the methacryloyloxy group is more preferable.

In Formula (I), examples of the linear or branched alkylene group having 1 to 14 carbon atoms, represented by one aspect of Sp¹ and Sp², including suitable aspects thereof, include the same ones as those described in Sp⁴ and Sp⁵ in Formula (Ar-3).

As $Sp^1$ and $Sp^2$, a linear or branched alkylene group having 1 to 14 carbon atoms (more preferably having 2 to 10 carbon atoms) or a divalent linking group in which one or more of —CH$_2$—'s constituting the linear or branched alkylene group having 2 to 14 carbon atoms (more preferably having 4 to 12 carbon atoms) are substituted with —O— or —CO— is preferable.

In Formula (I), a sum of n1 and m1 and a sum of m2 and n2 are each preferably an integer of 1 to 3, more preferably 1 or 2, and still more preferably 2.

A sum of n1, m1, m2, and n2 is preferably an integer of 3 to 7, more preferably an integer of 3 to 5, and still more preferably 3 or 4.

Above those, from the viewpoint of expressing a phase difference per film thickness, that is, enabling a reduction of the thickness, it is preferable that all of n1, m1, m2, and n2 are 1; and from the viewpoint of improving the durability of the optically anisotropic layer, it is preferable that both of n1 and n2 are 0, and both of m1 and m2 are 2.

In Formula (I), examples of the divalent linking groups represented by $X^1$, $X^2$, $X^3$, $X^4$, $X^5$, and $X^6$ include the same as those described in $X^{11}$ and $X^{12}$ in Formula (Ar-3).

As $X^1$, $X^2$, $X^3$, $X^4$, $X^5$, and $X^6$, the single bond, —CO—, —O—, or —CO—O— is preferable.

In Formula (I), examples of the aromatic ring which may have a substituent, represented by each of $Ar^1$ and $Ar^2$, including suitable aspects thereof, include the same ones as the aromatic ring which may have a substituent, which is one aspect of the ring $B^1$.

In Formula (I), the alicyclic ring which may have a substituent, represented by each of $Cy^1$ and $Cy^2$, including suitable aspects thereof, include the same ones as the alicyclic ring, which may have a substituent, which is one aspect of the ring $B^1$.

In Formula (I), m0 preferably represents 1. In addition, in a case where m0 represents 2, $X^3$ between the two $Ar^3$'s preferably represents a single bond.

In Formula (I), as $Ar^3$, any of aromatic rings selected from the group consisting of the groups represented by Formula (Ar-1), Formula (Ar-2), Formula (Ar-4), and Formula (Ar-5) is preferable, and any of aromatic rings selected from the group consisting of the groups represented by Formulae (Ar-1) and (Ar-2) is more preferable.

Examples of the compound represented by Formula (I) include the compounds represented by General Formula (1) described in JP2010-084032A (in particular, the compounds described in paragraph Nos. [0067] to [0073]), the compound represented by General Formula (II) described in JP2016-053709A (in particular, the compounds described in paragraph Nos. [0036] to [0043]), and the compounds represented by General Formula (1) described in JP2016-081035A (in particular, the compounds described in paragraph Nos. [0043] to [0055]).

Moreover, suitable examples of the compound represented by Formula (I) include compounds represented by Formulae (1) to (22), and specific examples thereof include the compounds having side chain structures shown in Tables 1 to 3 below as K (side chain structure) in Formulae (1) to (22).

Furthermore, in Tables 1 to 3 below, "*" shown in the side chain structure of K represents a bonding position to an aromatic ring.

In addition, in the side chain structures shown in 2-2 in Table 2 below and 3-2 in Table 3 below, a group adjacent to each of the acryloyloxy group and the methacryloyl group represents a propylene group (a group in which a methyl group is substituted with an ethylene group), and represents a mixture of regioisomers in which the positions of the methyl groups are different.

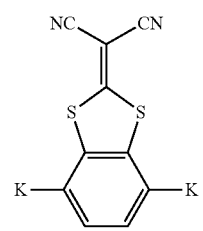

(1)

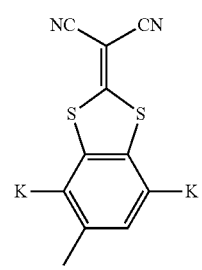

(2)

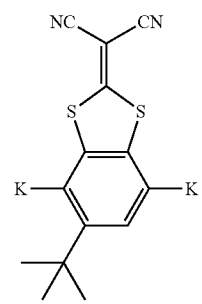

(3)

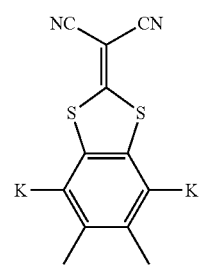

(4)

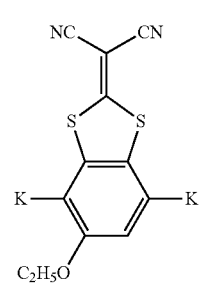

(5)

(6)
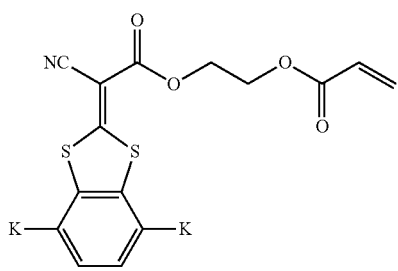
(7)
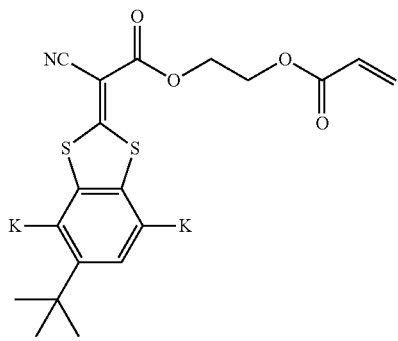
(8)
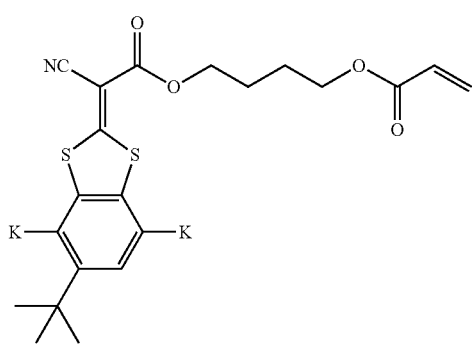
(9)
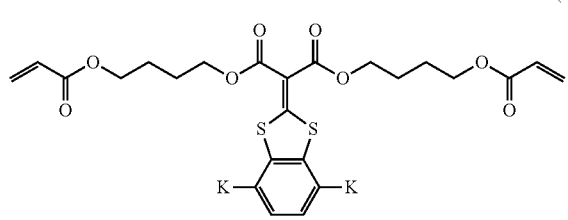
(10)
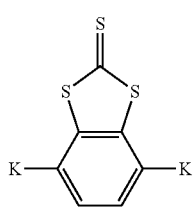
(11)
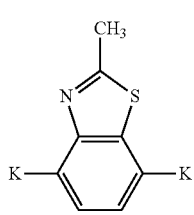
(12)
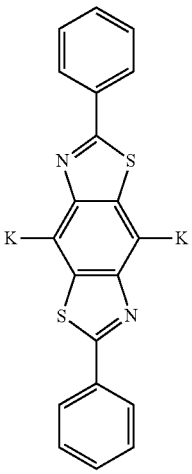
(13)
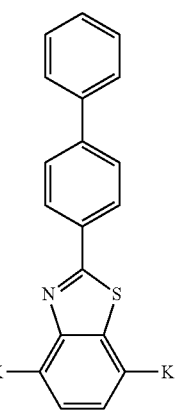
(4)
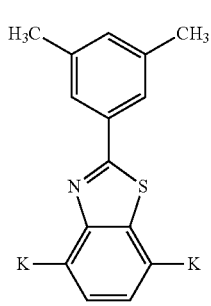
(15)
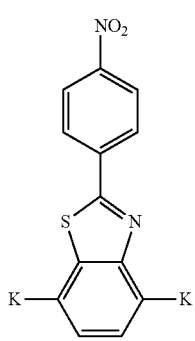

-continued
(16)
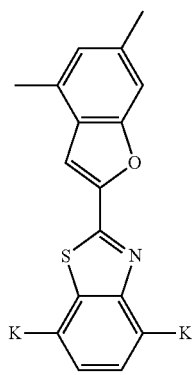
(17)
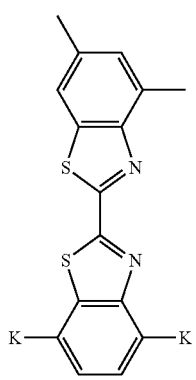
(18)
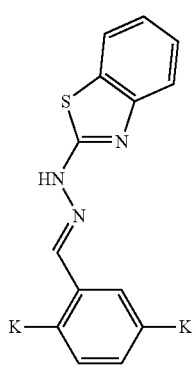
(19)
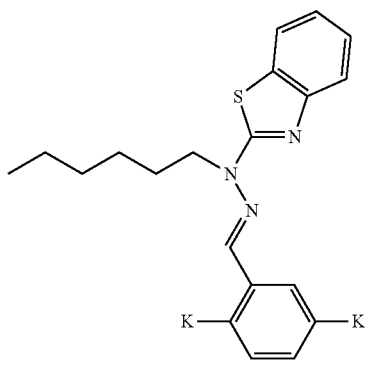
-continued
(20)
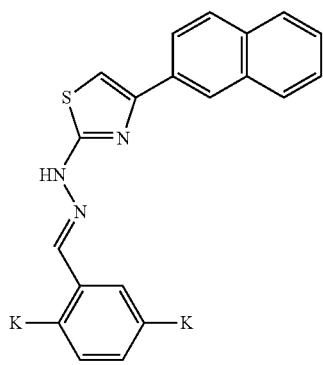
(21)
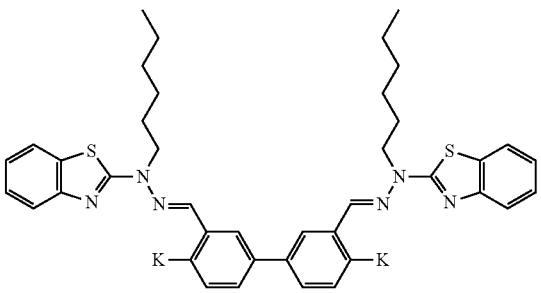
(22)
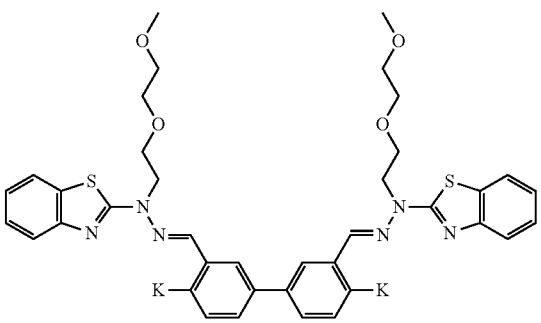

TABLE 1

| | K (side chain structure) |
|---|---|
| 1-1 | *—O—C(=O)—[cyclohexane]—C(=O)—O—[phenyl]—O—C₆H₁₂—O—C(=O)—CH=CH₂ |
| 1-2 | *—O—C(=O)—[cyclohexane]—C(=O)—O—[phenyl]—O—C₁₁H₂₂—O—C(=O)—CH=CH₂ |
| 1-3 | *—O—C(=O)—[cyclohexane]—C(=O)—O—[phenyl]—O—CH₂CH₂—O—CH₂CH₂—O—CH₂CH₂—O—C(=O)—CH=CH₂ |
| 1-4 | *—O—C(=O)—[cyclohexane]—C(=O)—O—[phenyl]—O—CH₂CH₂—O—CH₂CH₂—O—C(=O)—CH=CH₂ |
| 1-5 | *—O—C(=O)—[phenyl]—O—(CH₂)₆—O—C(=O)—CH=CH₂ |
| 1-6 | *—O—C(=O)—[cyclohexane]—C(=O)—O—[phenyl]—C(=O)—O—(CH₂)₃—O—C(=O)—CH=CH₂ |

TABLE 2

| | K (side chain structure) |
|---|---|
| 2-1 | *—O—C(=O)—[cyclohexane]—[cyclohexane]—C(=O)—O—CH₂CH₂—O—C(=O)—CH=CH₂ |
| 2-2 | *—O—C(=O)—[cyclohexane]—[cyclohexane]—C(=O)—O—CH₂—C(CH₃)₂—CH₂—O—C(=O)—CH=CH₂ |
| 2-3 | *—O—C(=O)—[cyclohexane]—[cyclohexane]—C(=O)—O—CH₂CH₂CH₂—O—C(=O)—CH=CH₂ |

TABLE 2-continued

| K (side chain structure) |

2-4, 2-5, 2-6, 2-7, 2-8, 2-9, 2-10, 2-11, 2-12, 2-13, 2-14

TABLE 3
| K (side chain structure) |
|---|
| 3-1 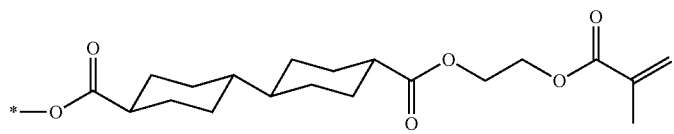 [SMILES: *OC(=O)C1CCC(C2CCC(C(=O)OCCOC(=O)C(=C)C)CC2)CC1] |
| 3-2 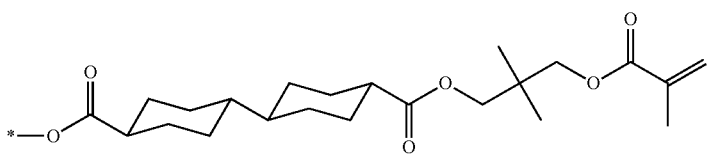 [SMILES: *OC(=O)C1CCC(C2CCC(C(=O)OCC(C)(C)COC(=O)C(=C)C)CC2)CC1] |
| 3-3 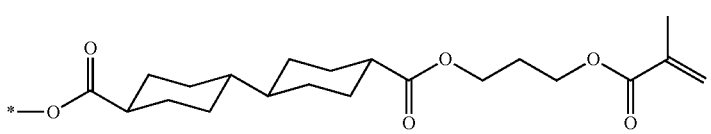 [SMILES: *OC(=O)C1CCC(C2CCC(C(=O)OCCCOC(=O)C(=C)C)CC2)CC1] |
| 3-4 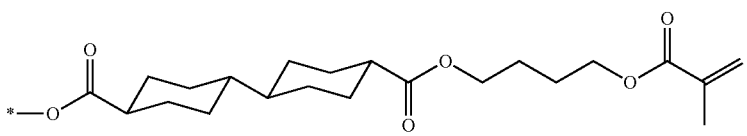 [SMILES: *OC(=O)C1CCC(C2CCC(C(=O)OCCCCOC(=O)C(=C)C)CC2)CC1] |
| 3-5 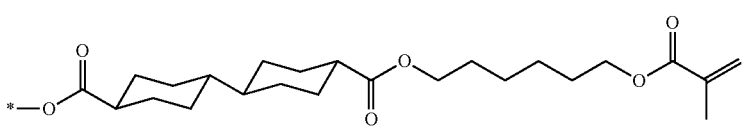 [SMILES: *OC(=O)C1CCC(C2CCC(C(=O)OCCCCCCOC(=O)C(=C)C)CC2)CC1] |
| 3-6 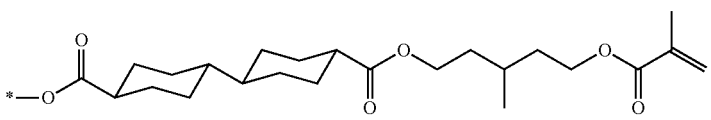 [SMILES: *OC(=O)C1CCC(C2CCC(C(=O)OCCC(C)CCOC(=O)C(=C)C)CC2)CC1] |
| 3-7 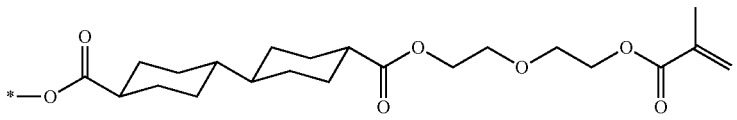 [SMILES: *OC(=O)C1CCC(C2CCC(C(=O)OCCOCCOC(=O)C(=C)C)CC2)CC1] |
| 3-8 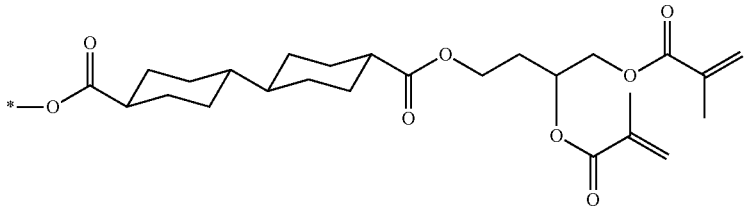 [SMILES: *OC(=O)C1CCC(C2CCC(C(=O)OCCC(COC(=O)C(=C)C)OC(=O)C(=C)C)CC2)CC1] |
| 3-9 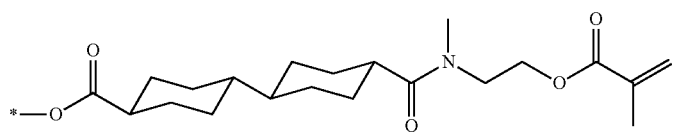 [SMILES: *OC(=O)C1CCC(C2CCC(C(=O)N(C)CCOC(=O)C(=C)C)CC2)CC1] |
| 3-10 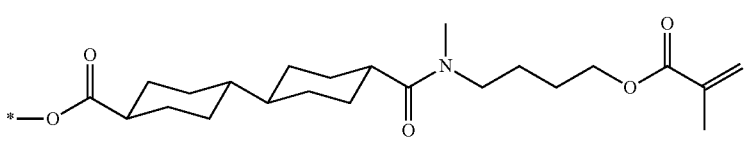 [SMILES: *OC(=O)C1CCC(C2CCC(C(=O)N(C)CCCCOC(=O)C(=C)C)CC2)CC1] |

TABLE 3-continued

K (side chain structure)

3-11

[Chemical structure]

3-12

[Chemical structure]

3-13

[Chemical structure]

3-14

[Chemical structure]

It is preferable that the rod-shaped liquid crystal compound is a compound exhibiting a liquid crystal state of a smectic phase for a reason that the contrast of an image display device having the optically anisotropic layer is good.

Among those, the liquid crystal state of the smectic phase exhibited by the rod-shaped liquid crystal compound is preferably a higher-order smectic phase. The higher-order smectic phase as mentioned herein is a smectic A phase, a smectic B phase, a smectic D phase, a smectic E phase, a smectic F phase, a smectic G phase, a smectic H phase, a smectic I phase, a smectic J phase, a smectic K phase, or a smectic L phase, and among these, the smectic A phase, the smectic B phase, the smectic F phase, the smectic I phase, the slanted smectic F phase, or the slanted smectic I phase is preferable, and the smectic A phase or the smectic B phase is more preferable.

<Monofunctional Compound>

The monofunctional compound included in the present composition has a polymerizable group $P^3$ capable of being polymerized with the rod-shaped liquid crystal compound, constituting one terminal of the monofunctional compound, an aromatic ring Ar which may have a substituent, constituting the other terminal of the monofunctional compound, and one or more rings $B^2$ selected from the group consisting of an aromatic ring which may have a substituent and an alicyclic ring which may have a substituent, and existing on a bond that links the polymerizable group $P^3$ and the aromatic ring Ar.

In addition, the monofunctional compound satisfies the relationship of Expressions (1) and (2) mentioned above with the rod-shaped liquid crystal compound.

Examples of the polymerizable group $P^3$ constituting one terminal of the monofunctional compound, including suitable aspects thereof, include the same ones as the polymerizable groups $P^1$ and $P^2$ of the above-mentioned rod-shaped liquid crystal compound, and among these, the polymerizable group represented by any of Formulae (P-1) to (P-20) mentioned above is preferable.

Examples of the aromatic ring Ar constituting the other terminal of the monofunctional compound include aromatic rings having 6 to 20 carbon atoms, and more specifically aromatic hydrocarbon rings such as a benzene ring, a naphthalene ring, an anthracene ring, and a phenanthroline ring; and aromatic heterocyclic rings such as a furan ring, a thiophene ring, a pyrrole ring, an oxazole ring, an isoxazole ring, an oxadiazole ring, a thiazole ring, an isothiazole ring, a thiadiazole ring, an imidazole ring, a pyrazole ring, a triazole ring, a furazan ring, a tetrazole ring, a pyridine ring, a pyridazine ring, a pyrimidine ring, a pyrazine ring, a triazine ring, a tetrazine ring, and a benzothiazole ring, and among these, the benzene ring (for example, a 1,4-phenyl group) is preferable.

Furthermore, examples of the substituent which may be contained in the aromatic ring Ar, including suitable aspects thereof, include the same ones as the substituents which may be contained in the aromatic ring or the alicyclic ring which is one aspect of the ring $B^1$, described in the rod-shaped liquid crystal compound mentioned above.

The aromatic ring Ar constituting the other terminal of the monofunctional compound preferably has no substituent.

In a monofunctional compound, the expression of the ring $B^2$ "existing on a bond that links the polymerizable group $P^3$ and the aromatic ring Ar" means that the ring $B^2$ constitutes a part of a portion necessary for directly linking the polymerizable group $P^3$ and the aromatic ring Ar.

Examples of the aromatic ring which may have a substituent and the alicyclic ring which may have a substituent, represented by the ring $B^2$, including suitable aspects thereof, include the aromatic ring which may have a substituent and the alicyclic ring which may have a substituent, represented by the ring $B^1$, described in the rod-shaped liquid crystal compound mentioned above.

The monofunctional compound preferably has at least one cyclohexane ring, more preferably has at least one 1,4-cyclohexylene group, and still more preferably has at least one trans-1,4-cyclohexylene group, as the ring $B^2$.

The number of the rings $B^2$ contained in the monofunctional compound is not particularly limited, but is preferably 1 to 3, and more preferably 2 from the viewpoint of the alignment properties of the liquid crystal compound.

The monofunctional compound is preferably a compound represented by Formula (II) from the viewpoint of the alignment properties of the liquid crystal compound.

$$P^3-Sp^3-(X^7-Ar^4)_{n3}-(X^8-Cy^3)_{m3}-X^9-Ar^5 \quad (II)$$

In Formula (I), $P^3$ represents a polymerizable group capable of being polymerized with the rod-shaped liquid crystal compound.

$Sp^3$ represents a single bond, a linear or branched alkylene group having 1 to 14 carbon atoms, or a divalent linking group in which one or more of —CH$_2$—'s constituting the linear or branched alkylene group having 1 to 14 carbon atoms are substituted with —O—, —S—, —NH—, —N(Q)-, or —CO—, where Q represents a substituent.

n3 and m3 each represent an integer from 0 to 2. It should be noted that at least one of m3 or n3 represents 1 or more.

$X^7$, $X^8$, and $X^9$ each independently represent a single bond; or —CO—, —O—, —S—, —C(=S)—, —CR$^1$R$^2$—, —CR$^3$=CR$^4$—, —NR$^5$—, or a divalent linking group consisting of a combination of two or more of these groups, where $R^1$ to $R^5$ each independently represent a hydrogen atom, a fluorine atom, or an alkyl group having 1 to 12 carbon atoms. It should be noted that in a case where n3 is 2, a plurality of $X^7$'s may be the same as or different from each other; and in a case where m3 is 2, a plurality of $X^8$'s may be the same as or different from each other.

$Ar^4$ and $Ar^5$ each independently represent an aromatic ring which may have a substituent. It should be noted that in a case where n3 is 2, a plurality of $Ar^4$'s may be the same as or different from each other.

$Cy^3$ represents an alicyclic ring which may have a substituent. It should be noted that in a case where m3 is 2, a plurality of $Cy^3$'s may be the same as or different from each other.

In Formula (II), examples of the polymerizable group represented by $P^3$ include the same ones as the above-mentioned polymerizable groups which are radically polymerizable or cationically polymerizable, described in the rod-shaped liquid crystal compound mentioned above; among these, the above-mentioned polymerizable groups represented by any of Formulae (P-1) to (P-20) are preferable, and the acryloyloxy group or the methacryloyloxy group is more preferable.

In Formula (II), examples of the linear or branched alkylene group having 1 to 14 carbon atoms, represented by one aspect of $Sp^3$, including suitable aspects thereof, include the same ones as the linear or branched alkylene group having 1 to 14 carbon atoms, represented by one aspect of $Sp^1$ and the like in Formula (I).

As $Sp^3$, a linear or branched alkylene group having 1 to 14 carbon atoms or a divalent linking group in which one or more of —CH$_2$—'s constituting the linear or branched alkylene group having 1 to 14 carbon atoms are substituted with —O— or —CO— is preferable, and a linear or branched alkylene group having 1 to 10 carbon atoms is more preferable.

In Formula (II), n3 is preferably 0 or 1, and m3 is preferably 1 or 2.

In addition, a sum of n3 and m3 is preferably an integer of 1 to 3, more preferably 1 or 2, and still more preferably 2.

In a case where the rod-shaped liquid crystal compound is a compound represented by Formula (I) and the monofunctional compound is a compound represented by Formula (II), the contrast of an image display device having the optically anisotropic layer is more excellent, and from the viewpoint that the generation of defects in the optically anisotropic layer can be further suppressed, it is preferable that both of n3 and m3 in Formula (II) are the same as both n1 and m1 in Formula (I), respectively, or the same as n2 and m2 in Formula (I), respectively.

In Formula (II), examples of the divalent linking group represented by each of $X^7$, $X^8$, and $X^9$ include the same ones as those described in $X^{11}$ and $X^{12}$ in Formula (Ar-3).

As $X^7$, $X^8$, and $X^9$, the single bond, —CO—, —O—, or —COO— is preferable.

In Formula (II), examples of the aromatic ring which may have a substituent, represented by $Ar^4$, include the same ones as the aromatic ring which may have a substituent, which is one aspect of the ring $B^1$. Among those, the benzene ring (for example, a 1,4-phenylene group) is preferable.

In Formula (II), examples of the alicyclic ring which may have a substituent, represented by $Cy^3$, include the same ones as the alicyclic ring which may have a substituent, which is one aspect of the ring $B^1$. Among those, the cycloalkane ring is preferable, the cyclohexane ring is more preferable, the 1,4-cyclohexylene group is still more preferable, and the trans-1,4-cyclohexylene group is particularly preferable.

In Formula (II), examples of the aromatic ring which may have a substituent, represented by $Ar^5$, include the same aromatic ring which may have a substituent, which is one aspect of the ring $B^1$. Among those, the naphthalene ring or the benzene ring which may have a substituent is preferable, the benzene ring which may have a substituent is more preferable, and the benzene ring (phenyl group) which does not have a substituent is further preferable.

Specific examples of the compound represented by Formula (II) include compounds represented by Formulae (TN-1) to (TN-15).

(TN-1)

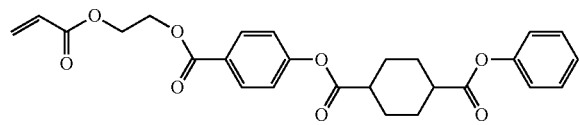

(TN-2)

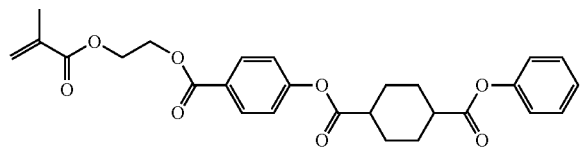

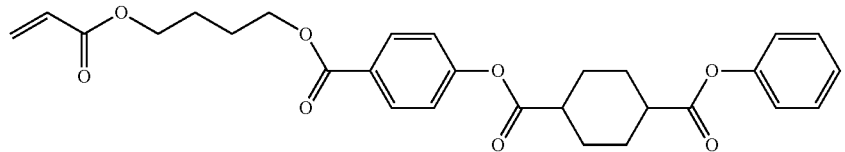

(TN-3)

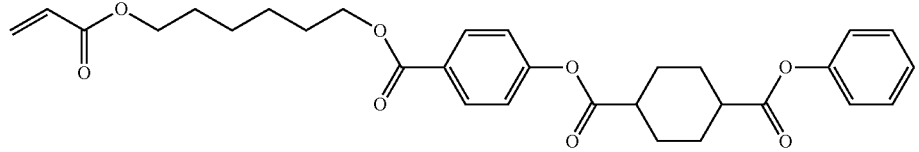

(TN-4)

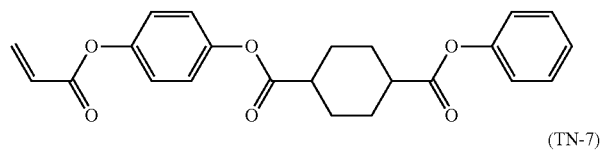

(TN-5)

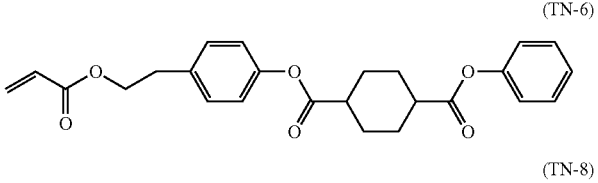

(TN-6)

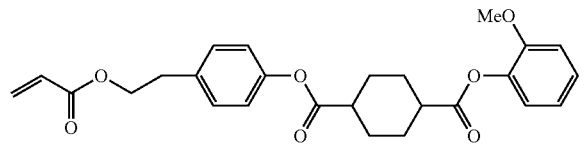

(TN-7)

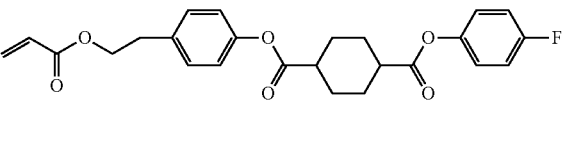

(TN-8)

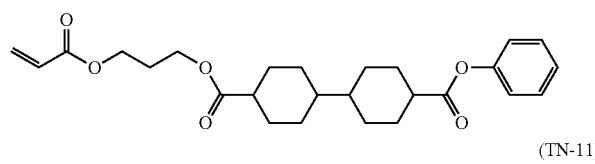

(TN-9)

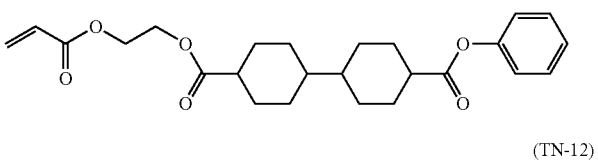

(TN-10)

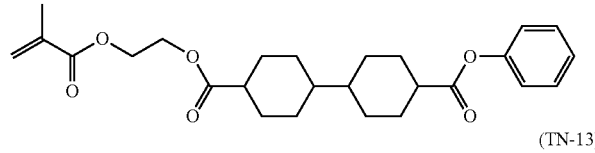

(TN-11)

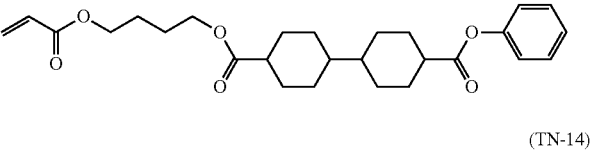

(TN-12)

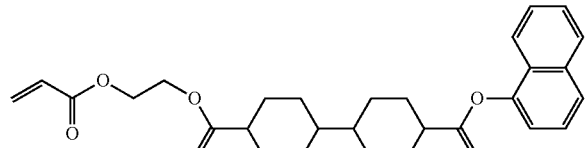

(TN-13)

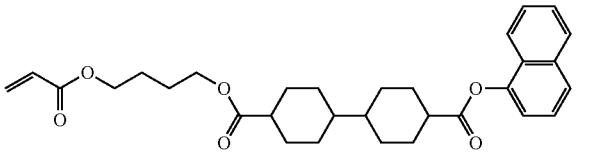

(TN-14)

(TN-15)

From the viewpoint of suppressing alignment defects due to shrinkage during curing without disturbing the alignment of the liquid crystal compound, a content of the monofunctional compound is preferably 1 to 100 parts by mass, and more preferably 5 to 50 parts by mass with respect to 100 parts by mass of the rod-shaped liquid crystal compound.

<Combination of Rod-Shaped Liquid Crystal Compound and Monofunctional Compound>

From the viewpoint of further suppressing the generation of defects in the optically anisotropic layer, it is preferable that the array of the rings consisting of the rings $B^2$ and the rings Ar arranged in order from the polymerizable group $P^3$ in the monofunctional compound is the same array as that of the ring $B^1$ arranged from the polymerizable group $P^1$ or $P^2$ in the rod-shaped liquid crystal compound.

Here, with regard to the array of the rings in the rod-shaped liquid crystal compound and the monofunctional compound, in a case where all of objects to be compared are aromatic rings, it is considered that the objects constitute the same array even though the objects have different ring structures or substituents; and in a case where all of objects to be compared are alicyclic rings, it is considered that the objects constitute the same array even though the objects have different ring structures or substituents. In addition, it is assumed that the array of the rings does not include the structure of a linking portion between the two rings. In a case where all of rings to be compared are aromatic rings, it is considered that the rings constitute the same array even though they have different skeletons as in cases with, for example, a phenylene group and a naphthylene group; and in a case where all of rings to be compared are alicyclic rings, it is considered that the rings constitute the same array even though the rings have different skeletons as in cases with, for example, cyclohexylene and cyclopentalene.

More specifically, the array of rings consisting of rings $B^2$ and rings Ar of the following compound A1 which is an example of the monofunctional compound is the same as the array of rings $B^1$ of the following rod-shaped liquid crystal compound R3.

$B^1$ and the divalent linking group constituting the portion W1, and the ring $B^3$ and the divalent linking group constituting the portion W2 are exactly the same in terms of, for example, the types, the order of arrangement, and the substituents. In addition, there exist cases where since the portion W2 of the monofunctional compound does not include the aromatic ring Ar, the rod-shaped liquid crystal compound has the portion W1 having the same structure as the structure of the portion W2 of the monofunctional compound, and does not have the aromatic ring Ar contained in the monofunctional compound.

The portion W1 of the rod-shaped liquid crystal compound and the portion W2 of the monofunctional compound will be more specifically described.

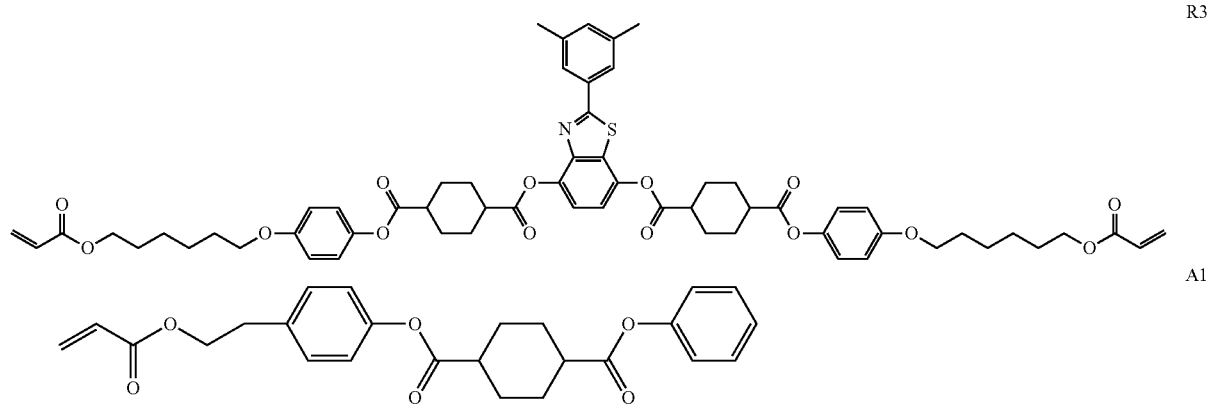

From the viewpoint that the contrast of an image display device having the optically anisotropic layer is more excellent and the generation of defects in the optically anisotropic layer can be further suppressed, it is preferable that a structure of a portion W2 from the ring $B^2$ closest to the polymerizable group $P^3$ to a group closest to the aromatic ring Ar on the bond that links the polymerizable group $P^3$ and the aromatic ring Ar of the monofunctional compound is the same as a structure of a portion W1 from the ring $B^1$ closest to the polymerizable group $P^1$ or $P^2$ on the bond that links the polymerizable groups $P^1$ and $P^2$ of the rod-shaped liquid crystal compound.

Here, the portion W2 in the monofunctional compound includes the ring $B^2$ closest to the polymerizable group $P^3$ and the group closest to the aromatic ring Ar, and does not include the aromatic ring Ar. In addition, the portion W1 in the rod-shaped liquid crystal compound includes one of the ring $B^1$ closest to the polymerizable group $P^1$ and the ring $B^1$ closest to the polymerizable group $P^2$ among the three or more rings $B^1$. In a case where the rod-shaped liquid crystal compound has the same structure as the portion W2 in the monofunctional compound as the structure of the portion W1 from the ring $B^1$ closest to the polymerizable group $P^1$ or $P^2$, the ring $B^2$ closest to the polymerizable group $P^3$ in the monofunctional compound is the same as at least one of the ring $B^1$ closest to the polymerizable group $P^1$ or the ring $B^1$ closest to the polymerizable group $P^2$ in the rod-shaped liquid crystal compound.

Furthermore, the expression that the structure of the portion W1 contained in the rod-shaped liquid crystal compound and the structure of the portion W2 contained in the monofunctional compound are the same means that the ring In a case where the rod-shaped liquid crystal compound is a compound represented by Formula (I), a portion obtained by taking $X^1$ bonded to $Sp^1$ in a case where n1 represents 1 or 2 and $X^2$ bonded to $Sp^1$ in a case where n1 represents 0 from a partial structure represented by "$(X^1-Ar^1)_{n1}-(X^2-Cy^1)_{m1}-X^3$" in Formula (I); or a portion obtained by taking $X^6$ bonded to $Sp^2$ in a case where n2 represents 1 or 2 and $X^5$ bonded to $Sp^2$ in a case where n2 represents 0 from a partial structure represented by "$X^4-(Cy^2-X^3)_{m2}-(Ar^2-X^6)_{n2}$" corresponds to the portion W1.

In addition, in a case where the monofunctional compound is a compound represented by Formula (II), a portion obtained by taking $X^1$ bonded to $Sp^3$ in a case where n3 represents 1 or 2; or a portion by taking $X^8$ bonded to $Sp^3$ in a case where n1 represents 0 from a partial structure represented by "$(X^7-Ar^4)_{n3}-X^8-Cy^3)_{m3}-X^9$" in Formula (II) corresponds to the portion W2. That is, the "ring $B^2$ closest to the polymerizable group $P^3$" included in the portion W2 is a ring existing on the leftmost side on the paper surface among $Ar^4$ and $Cy^3$ included in the partial structure. In addition, in this case, in a case where $X^9$ represents the divalent linking group, the group closest to the aromatic ring Ar is $X^9$; in a case where $X^9$ represents a single bond and m3 represents 1 or 2, the group closest to the aromatic ring Ar is $Cy^3$; and in a case where $X^9$ represents a single bond and m3 represents 0, the group closest to the aromatic ring Ar is $Ar^4$.

More specifically, in the combination of the following rod-shaped liquid crystal compound R3 and the following monofunctional compound A1, portions enclosed in parentheses correspond to the portions W1 and W2, respectively. That is, in the monofunctional compound A1, the 1,4- phenylene group corresponds to "the ring $B^2$ closest to the polymerizable group $P^3$", and the oxygen atom bonded to the phenyl group corresponds to "the group closest to the aromatic ring Ar". In addition, in the rod-shaped liquid crystal compound R3, both of the two 1,4-phenylene groups correspond to the "the ring $B^1$ closest to the polymerizable group $P^1$ or $P^2$".

That is, in a case of the combination of the rod-shaped liquid crystal compound R3 and the monofunctional compound A1, it can be said that the rod-shaped liquid crystal compound R3 has two structures in the molecule, which are the same as that of the portion W2 of the monofunctional compound A1.

Examples of the solvent include ketones (for example, acetone, 2-butanone, methyl isobutyl ketone, cyclohexanone, and cyclopentanone), ethers (for example, dioxane and tetrahydrofuran), aliphatic hydrocarbons (for example, hexane), alicyclic hydrocarbons (for example, cyclohexane), aromatic hydrocarbons (for example, toluene, xylene, and trimethylbenzene), halogenated carbons (for example, dichloromethane, dichloroethane, dichlorobenzene, and chlorotoluene), esters (for example, methyl acetate, ethyl acetate, and butyl acetate), water, alcohols (for example, ethanol, isopropanol, butanol, and cyclohexanol), cellosolves (for example, methyl cellosolve and ethyl cellosolve), cellosolve acetates, sulfoxides (for example, dim-

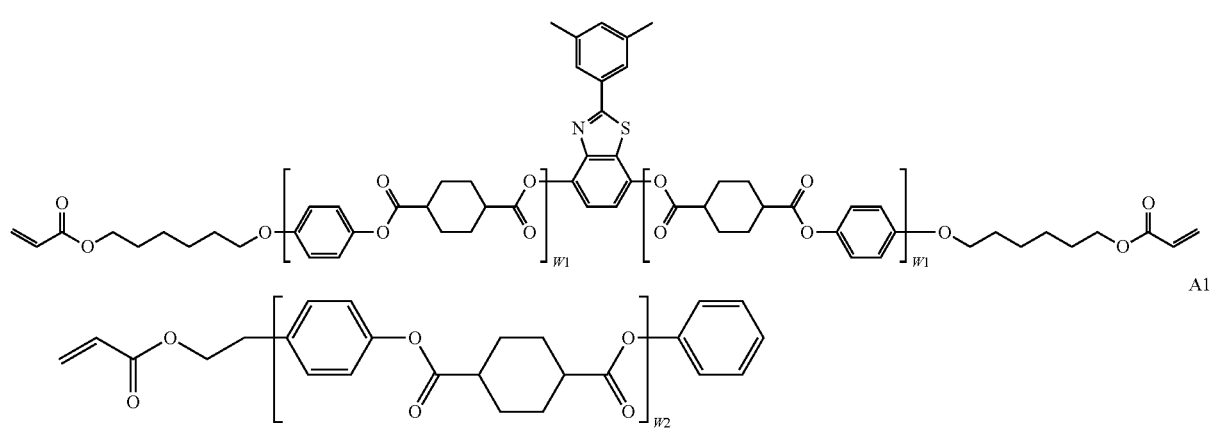

ethyl sulfoxide), and amides (for example, dimethylformamide and dimethylacetamide). The solvents may be used singly or in combination of two or more kinds thereof.

<Leveling Agent>

It is preferable that the present composition includes a leveling agent from the viewpoint that the surface of an optically anisotropic layer is maintained smooth and the alignment is easily controlled.

Such a leveling agent is preferably a fluorine-based leveling agent or a silicon-based leveling agent for a reason that it has a high leveling effect on the addition amount, and the leveling agent is more preferably a fluorine-based leveling agent from the viewpoint that it is less likely to cause bleeding (bloom or bleed).

Examples of the leveling agent include the compounds described in paragraphs [0079] to [0102] of JP2007-069471A, the compound represented by General Formula (I) described in JP2013-047204A (in particular, the compounds described in paragraphs [0020] to [0032]), the compound represented by General Formula (I) described in JP2012-211306A (in particular, the compounds described in paragraphs [0022] to [0029]), the liquid crystal alignment accelerator represented by General Formula (I) described in JP2002-129162A (in particular, the compounds described in paragraphs [0076] to [0078] and [0082] to [0084]), and the compounds represented by General Formulae (I), (II), and (III) described in JP2005-099248A (in particular, the compounds described in paragraphs [0092] to [0096]). Furthermore, the leveling agent may also function as an alignment control agent which will be described later.

<Alignment Control Agent>

The present composition may include an alignment control agent as necessary.

<Polymerization Initiator>

The present composition preferably includes a polymerization initiator.

As the polymerization initiator, a photopolymerization initiator capable of initiating a polymerization reaction upon irradiation with ultraviolet rays is preferable.

Examples of the photopolymerization initiator include α-carbonyl compounds (described in each of the specifications of U.S. Pat. Nos. 2,367,661A and 2,367,670A), acyloin ethers (described in the specification of U.S. Pat. No. 2,448,828A), α-hydrocarbon-substituted aromatic acyloin compounds (described in the specification of U.S. Pat. No. 2,722,512A), multinuclear quinone compounds (described in each of the specifications of U.S. Pat. Nos. 3,046,127A and 2,951,758A), combinations of a triarylimidazole dimer and a p-aminophenyl ketone (described in the specification of U.S. Pat. No. 3,549,367A), acridine and phenazine compounds (described in JP1985-105667A (JP-S60-105667A) and the specification of U.S. Pat. No. 4,239,850A), oxadiazole compounds (described in the specification of U.S. Pat. No. 4,212,970A), and acyl phosphine oxide compounds (described in JP1988-040799B (JP-S63-040799B), JP1993-029234B (JP-H05-029234B), JP1998-095788A (JP-H10-095788A), and JP1998-029997A (JP-H10-029997A)).

As the polymerization initiator, an oxime-type polymerization initiator is also preferable. Specific examples thereof include the initiators described in paragraphs [0049] to [0052] of WO2017/170443A.

<Solvent>

It is preferable that the present composition includes a solvent from the viewpoint of workability in formation of an optically anisotropic layer, and the like.

With the alignment control agent, various alignment states such as homeotropic alignment (vertical alignment), tilt alignment, hybrid alignment, and cholesteric alignment can be formed, in addition to the homogeneous alignment, and specific alignment states can be controlled and achieved more uniformly and more accurately.

As an alignment control agent which accelerates the homogeneous alignment, for example, a low-molecular-weight alignment control agent and a high-molecular-weight alignment control agent can be used.

With regard to the low-molecular-weight alignment control agent, reference can be made to the description in, for example, paragraphs [0009] to [0083] of JP2002-020363A, paragraphs [0111] to [0120] of JP2006-106662A, and paragraphs [0021] to [0029] of JP2012-211306A, the contents of which are hereby incorporated by reference.

In addition, with regard to the high-molecular-weight alignment control agent, reference can be made to the description in, for example, paragraphs [0021] to [0057] of JP2004-198511A and paragraphs [0121] to [0167] of JP2006-106662A, the contents of which are hereby incorporated by reference.

Moreover, examples of an alignment control agent which forms or accelerates a homeotropic alignment include a boronic acid compound and an onium salt compound. With regard to the alignment control agent, reference can be made to the description in the compounds described in paragraphs [0023] to [0032] of JP2008-225281A, paragraphs [0052] to [0058] of JP2012-208397A, paragraphs [0024] to [0055] of JP2008-026730A, and paragraphs [0043] to [0055] of JP2016-193869A, the contents of which are hereby incorporated by reference.

On the other hand, the cholesteric alignment can be achieved by adding a chiral agent to the present composition, and it is possible to control the direction of revolution of the cholesteric alignment by its chiral direction.

Incidentally, the pitch of the cholesteric alignment in accordance with the alignment regulating force of the chiral agent may be controlled.

In a case where the present composition includes an alignment control agent, a content thereof is preferably 0.01% to 10% by mass, and more preferably 0.05% to 5% by mass with respect to the mass of the total solid content of the composition. In a case where the content is within the range, it is possible to obtain a uniform and highly transparent cured product, in which precipitation or phase separation, and alignment defects are suppressed while a desired alignment state is achieved.

<Other Liquid Crystal Compounds>

The present composition may include other liquid crystal compounds, in addition to the rod-shaped liquid crystal compound and the monofunctional compound, each mentioned above.

Examples of such other liquid crystal compounds include a liquid crystal compound having two or more polymerizable groups and having forward wavelength dispersion.

In a case where the present composition includes another liquid crystal compound, a content of such another liquid crystal compound is preferably 1 to 200 parts by mass, and more preferably 5 to 100 parts by mass with respect to 100 parts by mass of the rod-shaped liquid crystal compound.

<Other Components>

The present composition may include components other than the above-mentioned components. Examples of such other components include a surfactant, a tilt angle control agent, an alignment assistant, a plasticizer, and a crosslinking agent.

[Method for Forming Optically Anisotropic Layer]

The optically anisotropic layer is a cured product obtained by curing the above-mentioned present composition and immobilizing the alignment state of the rod-shaped liquid crystal compound.

Examples of a method for forming the cured product include a method in which the above-mentioned composition is used to cause a desired alignment state, and then immobilized by polymerization.

Here, the polymerization conditions are not particularly limited, but in the polymerization by irradiation with light, ultraviolet rays are preferably used. The irradiation dose is preferably 10 mJ/cm$^2$ to 50 J/cm$^2$, more preferably 20 mJ/cm$^2$ to 5 J/cm$^2$, still more preferably 30 mJ/cm$^2$ to 3 J/cm$^2$, and particularly preferably 50 mJ/cm$^2$ to 1,000 mJ/cm$^2$. In addition, the polymerization may be carried out under a heating condition in order to accelerate the polymerization reaction.

In addition, the optically anisotropic layer can be formed on any of supports or alignment films in the optical film which will be described later or a polarizer in the polarizing plate which will be described later.

[Physical Properties of Optically Anisotropic Layer]

The optically anisotropic film shows a diffraction peak derived from a periodic structure in X-ray diffraction measurement.

Here, suitable examples of an aspect exhibiting the above-mentioned diffraction peak include an aspect in which molecules adjacent in the direction vertical to the alignment axis forms a layer and this layer is laminated in the direction parallel to the alignment axis, that is, an aspect exhibiting a smectic phase. Further, from the viewpoint that the smectic phase is easily expressed, it is preferable that the rod-shaped liquid crystal compound is a compound exhibiting a smectic phase in any of a case where the temperature is elevated and a case where the temperature is lowered.

In addition, whether or not the above-mentioned diffraction peak is exhibited can also be confirmed by observing a texture characteristic of a liquid crystal phase having a periodic structure with a polarizing microscope.

The alignment state of the rod-shaped liquid crystal compound in the optically anisotropic layer may be any of horizontal alignment, vertical alignment, tilt alignment, and twist alignment, and it is preferable that the rod-shaped liquid crystal compound is immobilized in a state of being horizontally aligned with respect to the main surface of the optically anisotropic layer.

In addition, in the present specification, the "horizontal alignment" means that the main surface of an optically anisotropic layer (or in a case where the optically anisotropic layer is formed on a member such as a support and an alignment film, a surface of the member) and the major axis direction of the rod-shaped liquid crystal compound are parallel. Incidentally, it is not required for the both to be strictly parallel, and in the present specification, the expression means that the both are aligned at an angle formed by the major axis direction of the rod-shaped liquid crystal compound and the main surface of the optically anisotropic layer of less than 10°.

In the optically anisotropic layer, the angle formed by the major axis direction of the rod-shaped liquid crystal compound and the main surface of the optically anisotropic layer is preferably 0 to 5°, more preferably 0 to 3°, and still more preferably 0 to 2°.

The optically anisotropic layer preferably satisfies Formula (III).

$$0.50 < Re(450)/Re(550) < 1.00 \quad (III)$$

Here, in Expression (III), Re(450) represents an in-plane retardation at a wavelength of 450 nm of the optically anisotropic layer, and Re(550) represents an in-plane retardation at a wavelength of 550 nm of the optically anisotropic layer. In addition, in the present specification, in a case where the measurement wavelength of the retardation is not specified, the measurement wavelength is 550 nm.

Furthermore, the values of the in-plane retardation (Re) and the thickness-direction retardation (Rth) refer to values measured with light at the measurement wavelength using AxoScan OPMF-1 (manufactured by Opto Science, Inc.).

Specifically, by inputting the average refractive index ((Nx+Ny+Nz)/3) and the film thickness (d (μm)) to AxoScan OPMF-1, it is possible to calculate:
Slow axis direction (°)
$Re(\lambda)=R0(\lambda)$
$Rth(\lambda)=((nx+ny)/2-nz) \times d$.

In addition, $R0(\lambda)$ is expressed in a numerical value calculated with AxoScan OPMF-1, but means $Re(\lambda)$.

In addition, the optically anisotropic layer is preferably a positive A plate or a positive C plate, and more preferably the positive A plate.

Here, the positive A plate (A plate which is positive) and the positive C plate (C plate which is positive) are defined as follows.

In a case where a refractive index in a film in-plane slow axis direction (in a direction in which an in-plane refractive index is maximum) is defined as nx, a refractive index in an in-plane direction orthogonal to the in-plane slow axis is defined as ny, and a refractive index in a thickness direction is defined as nz, the positive A plate satisfies the relationship of Expression (A1) and the positive C plate satisfies the relationship of Expression (C1). In addition, the positive A plate has an Rth showing a positive value and the positive C plate has an Rth showing a negative value.

$$nx > ny \approx nz \quad \text{Expression (A1)}$$

$$nz > nx \approx ny \quad \text{Expression (C1)}$$

Furthermore, the symbol, "≈", encompasses not only a case where the both sides are completely the same as each other but also a case where the both are substantially the same as each other.

In the expression, "substantially the same", with regard to the positive A plate, for example, a case where (ny−nz)×d (in which d is the thickness of a film) is −10 to 10 nm, and preferably −5 to 5 nm is also included in "ny=nz", and a case where (nx−nz)×d is −10 to 10 nm, and preferably −5 to 5 nm is also included in "nx=nz". In addition, with regard to the positive C plate, for example, a case where (nx−ny)×d (in which d is the thickness of a film) is 0 to 10 nm, and preferably 0 to 5 nm is also included in "nx=ny".

In a case where the optically anisotropic layer is a positive A plate, the Re(550) is preferably 100 to 180 nm, more preferably 120 to 160 nm, still more preferably 130 to 150 nm, and particularly preferably 130 to 140 nm, from the viewpoint that the optically anisotropic layer functions as λ/4 plate.

Here, the "λ/4 plate" is a plate having a λ/4 function, specifically, a plate having a function of converting a linearly polarized light at a certain specific wavelength into a circularly polarized light (or converting a circularly polarized light to a linearly polarized light).

[Optical Film]

The optical film is an optical film having the optically anisotropic layer.

The structure of the optical film will be described with reference to FIG. 1. FIG. 1 is a schematic cross-sectional view showing an example of the optical film.

Furthermore, FIG. 1 is a schematic view, and the thicknesses relationship, the positional relationship, and the like among the respective layers are not necessarily consistent with actual ones, and either of the support shown in FIG. 1 and an alignment film are optional constitutional members.

An optical film 10 shown in FIG. 1 has a support 16, an alignment film 14, and an optically anisotropic layer 12 as the cured product of the present composition in this order.

In addition, the optically anisotropic layer 12 may be a laminate of two or more different optically anisotropic layers. For example, in a case where the polarizing plate which will be described later is used as a circularly polarizing plate or in a case where the optical film is used as an optical compensation film for an IPS mode or an FFS mode liquid crystal display device, the optically anisotropic layer 12 is preferably a laminate of a positive A plate and a positive C plate.

In addition, the optically anisotropic layer may be peeled from the support, and the optically anisotropic layer may be used alone as an optical film.

Hereinafter, various members used for the optical film will be described in detail.

[Optically Anisotropic Layer]

The optically anisotropic layer which is contained in the optical film is the above-mentioned optically anisotropic layer.

In the optical film, a thickness of the optically anisotropic layer is not particularly limited, but is preferably 0.1 to 10 μm, and more preferably 0.5 to 5 μm.

[Support]

The optical film may have a support as a base material for forming an optically anisotropic layer as described above.

Such a support is preferably transparent. Specifically, a light transmittance of the support is preferably 80% or more.

Examples of such a support include a glass substrate and a polymer film. Examples of the material for the polymer film include cellulose-based polymers; acrylic polymers having an acrylic ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing these polymers.

In addition, an aspect in which a polarizer which will be described later may also function as such a support is also available.

A thickness of the support is not particularly limited, but is preferably 5 to 60 μm, and more preferably 5 to 40 μm.

[Alignment Film]

In the optical film, the optically anisotropic layer is preferably formed on the surface of a photo-alignment film. In a case where the optical film has any of the above-mentioned supports, it is preferable that the alignment film may be sandwiched between the support and the optically anisotropic layer. In addition, an aspect in which the above-mentioned support may also function as an alignment film is also available.

The alignment film may be any film as long as it has a function of horizontally aligning the rod-shaped liquid crystal compound included in the composition.

The alignment film often has a polymer as a main component. Polymer materials for the alignment film are described in many documents, and many commercially available products thereof can be used.

As the polymer material for the alignment film, a polyvinyl alcohol, a polyimide, or a derivative thereof is preferable, and a modified or non-modified polyvinyl alcohol is more preferable.

Examples of the alignment film which may be contained in the optical film include the alignment films described for Line 24 on Page 43 to Line 8 on Page 49 of WO01/088574A; the alignment films consisting of modified polyvinyl alcohols described in paragraphs [0071] to [0095] of JP3907735B; and the liquid crystal alignment film formed by a liquid crystal alignment agent described in JP2012-155308A.

Since an object does not come into contact with a surface of the alignment film upon formation of the alignment film and the deterioration of a surface condition can be prevented, it is preferable to use a photo-alignment film as the alignment film.

The photo-alignment film is not particularly limited, but the alignment film formed by a polymer material such as a polyamide compound and a polyimide compound, described in paragraphs [0024] to [0043] of WO2005/096041A; the liquid crystal alignment film formed by a liquid crystal alignment agent having a photo-alignment group, described in JP2012-155308A; LPP-JP265CP, trade name, manufactured by Rolic Technologies Ltd.; or the like can be used.

A thickness of the alignment film is not particularly limited, but from the viewpoint of forming an optically anisotropic layer having a uniform film thickness by mitigating the surface roughness that can be present on the support, the thickness is preferably 0.01 to 10 μm, more preferably 0.01 to 1 μm, and still more preferably 0.01 to 0.5 μm.

[Ultraviolet Absorber]

The optical film preferably includes an ultraviolet (UV) absorber, taking an effect of external light (particularly ultraviolet rays) into consideration.

The ultraviolet absorber may be included in the optically anisotropic layer or may also be included in a member other than an optically anisotropic layer constituting the optical film of the embodiment of the present invention. Suitable examples of the member other than the optically anisotropic layer include a support.

As the ultraviolet absorber, any one of ultraviolet absorbers known in the related art, which can express ultraviolet absorptivity, can be used. Among such the ultraviolet absorbers, a benzotriazole-based or hydroxyphenyltriazine-based ultraviolet absorber is preferable from the viewpoint that it has high ultraviolet absorptivity and ultraviolet absorbing ability (ultraviolet-shielding ability) used for an image display device is obtained.

In addition, in order to broaden ultraviolet absorbing ranges, two or more of ultraviolet absorbers having different maximum absorption wavelengths are also preferably used.

Examples of the ultraviolet absorber include the compounds described in paragraphs [0258] and [0259] of JP2012-018395A and the compounds described in paragraphs [0055] to [0105] of JP2007-072163A.

In addition, as a commercially available product thereof, for example, Tinuvin 400, Tinuvin 405, Tinuvin 460, Tinuvin 477, Tinuvin 479, and Tinuvin 1577 (all manufactured by BASF), or the like can be used.

[Polarizing Plate]

A polarizing plate has the above-mentioned optical film and a polarizer.

In a case where the above-mentioned optically anisotropic layer is a λ/4 plate (positive A plate), the polarizing plate can be used as a circularly polarizing plate.

In a case where the polarizing plate is used as a circularly polarizing plate, the above-mentioned optically anisotropic layer is used as a λ/4 plate (positive A plate), and an angle between the slow axis of the λ/4 plate and the absorption axis of a polarizer which will be described later is preferably 30° to 60°, more preferably 40° to 50°, still more preferably 42° to 48°, and particularly preferably 45°.

Here, the "slow axis" of the λ/4 plate means a direction in which the refractive index in the plane of the λ/4 plate is maximum, and the "absorption axis" of the polarizer means a direction in which the absorbance is highest.

In addition, the polarizing plate can also be used as an optical compensation film for an IPS mode or FFS mode liquid crystal display device.

In a case where the polarizing plate is used as an optical compensation film for an IPS mode or FFS mode liquid crystal display device, it is preferable that the above-mentioned optically anisotropic layer is used as at least one plate of a laminate of a positive A plate and a positive C plate, an angle formed by the slow axis of the positive A plate layer and the absorption axis of a polarizer which will be described later are orthogonal or parallel, and specifically, it is more preferable that an angle formed by the slow axis of the positive A plate layer and the absorption axis of the polarizer which will be described later is 0° to 5° or 85° to 95°.

In a case where the polarizing plate is used in a liquid crystal display device which will be described later, it is preferable that an angle formed by the slow axis of the optically anisotropic layer and the absorption axis of a polarizer which will be described later is parallel or orthogonal.

In addition, in the present specification, a term "parallel" does not require that the both are strictly parallel, but means that an angle between one and the other is less than 10°. In addition, in the present specification, a term "orthogonal" does not require that the both are strictly orthogonal, but means that the angle between one and the other is more than 80° and less than 100°.

[Polarizer]

A polarizer contained in the polarizing plate is not particularly limited as long as it is a member having a function of converting light into specific linearly polarized light, and an absorptive type polarizer and a reflective type polarizer, which are known in the related art, can be used.

An iodine-based polarizer, a dye-based polarizer using a dichroic dye, a polyene-based polarizer, or the like is used as the absorptive type polarizer. The iodine-based polarizer and the dye-based polarizer are classified into a coating type polarizer and a stretching type polarizer, any of which can be applied, but a polarizer which is manufactured by allowing polyvinyl alcohol to adsorb iodine or a dichroic dye and performing stretching is preferable.

In addition, examples of a method of obtaining a polarizer by carrying out stretching and dyeing in a state of a laminated film in which a polyvinyl alcohol layer is formed on a base material include the methods disclosed in JP5048120B, JP5143918B, JP4691205B, JP4751481B, and JP4751486B, and known technologies relating to these polarizers can also be preferably used.

Examples of the coating type polarizer include those of WO2018/124198A, WO2018/186503A, WO2019/132020A, WO2019/132018A, WO2019/189345A, JP2019-197168A, JP2019-194685A, and JP2019-139222A, and known techniques relating to these polarizers can also be preferably used.

A polarizer in which thin films having different birefringence are laminated, a wire grid-type polarizer, a polarizer having a combination of a cholesteric liquid crystal having a selective reflection range, a ¼ wavelength plate, and the like is used as the reflective type polarizer.

Among those, a polymer containing a polyvinyl alcohol-based resin (—$CH_2$—CHOH— as a repeating unit) from the viewpoint that it has more excellent adhesiveness. In particular, a polarizer containing at least one selected from the group consisting of polyvinyl alcohol and an ethylene-vinyl alcohol copolymer) is preferable.

In addition, from the viewpoint of imparting crack resistance, the polarizer may have a depolarization unit formed along the opposite end edges. Examples of the depolarization unit include JP2014-240970A.

In addition, the polarizer may have non-polarizing parts arranged at predetermined intervals in the longitudinal direction and/or the width direction. The non-polarizing part is a decolorized part which is partially decolorized. The arrangement pattern of the non-polarizing parts can be appropriately set according to a purpose. For example, the non-polarizing parts are arranged at a position corresponding to a camera unit of an image display device in a case where a polarizer is cut (cut, punched, or the like) to a predetermined size in order to be attached to the image display device in a predetermined size. Examples of the arrangement pattern of the non-polarizing parts include those in JP2016-027392A.

A thickness of the polarizer is not particularly limited, but is preferably 3 to 60 µm, more preferably 3 to 30 µm, and still more preferably 3 to 10 µm.

[Pressure Sensitive Adhesive Layer]

The polarizing plate may have a pressure sensitive adhesive layer arranged between the optically anisotropic layer in the optical film and the polarizer.

Examples of a material forming the pressure sensitive adhesive layer used for lamination of the cured product and the polarizer include a member formed of a substance in which a ratio (tan δ=G"/G') between a storage elastic modulus G' and a loss elastic modulus G", each measured with a dynamic viscoelastometer, is 0.001 to 1.5, in which a so-called pressure sensitive adhesive and a readily creepable substance is included. Examples of the pressure sensitive adhesive include a polyvinyl alcohol-based pressure sensitive adhesive, but the pressure sensitive adhesive is not limited thereto.

[Adhesive Layer]

In the polarizing plate, an adhesive layer may be arranged between the optically anisotropic layer in the optical film and the polarizer.

As the adhesive layer used for laminating a cured product and a polarizer, a curable adhesive composition that is cured by irradiation with active energy rays or heating is preferable.

Examples of the curable adhesive composition include a curable adhesive composition containing a cationically polymerizable compound and a curable adhesive composition containing a radically polymerizable compound.

A thickness of the adhesive layer is preferably 0.01 to 20 µm, more preferably 0.01 to 10 µm, and still more preferably 0.05 to 5 µm. In a case where the thickness of the adhesive layer is within this range, floating or peeling does not occur between the protective layer or optically anisotropic layer and the polarizer, which are laminated, and a practically acceptable adhesive force can be obtained. In addition, the thickness of the adhesive layer is preferably 0.4 µm or more from the viewpoint that the generation of air bubbles can be suppressed.

Moreover, from the viewpoint of durability, a bulk water absorption rate of the adhesive layer may be adjusted to 10% by mass or less, and preferably 2% by mass or less. The bulk water absorption rate is measured according to the water absorption rate testing method described in JIS K 7209.

With regard to the adhesive layer, reference can be made to the description in paragraphs [0062] to [0080] of JP2016-035579A, the contents of which are incorporated herein by reference.

[Easy Adhesion Layer]

In the polarizing plate, an easy adhesion layer may be arranged between the optically anisotropic layer in the optical film and the polarizer. A storage elastic modulus of the easy adhesion layer at 85° C. is preferably $1.0 \times 10^6$ Pa to $1.0 \times 10^7$ Pa from the viewpoints that the adhesiveness between the optically anisotropic layer and the polarizer is excellent and the generation of cracks in the polarizer is suppressed. Examples of the constituent material of the easy adhesion layer include a polyolefin-based component and a polyvinyl alcohol-based component. A thickness of the easy adhesion layer is preferably 500 nm to 1 µm.

With regard to the easy adhesion layer, reference can be made to the description in paragraphs [0048] to [0053] of JP2018-036345A, the contents of which are incorporated herein by reference.

[Image Display Device]

The image display device is an image display device having the optical film or the polarizing plate.

A display element used in the image display device is not particularly limited, and examples thereof include a liquid crystal cell, an organic electroluminescent (hereinafter simply referred to as "electroluminescence (EL)") display panel, and a plasma display panel. Among those, the liquid crystal cell and the organic EL display panel are preferable, and the liquid crystal cell is more preferable.

That is, as the image display device, a liquid crystal display device using a liquid crystal cell as a display element or an organic EL display device using an organic EL display panel as a display element is preferable, and the liquid crystal display device is more preferable.

[Liquid Crystal Display Device]

A liquid crystal display device which is an example of the image display device is a liquid crystal display device having the above-mentioned polarizing plate and a liquid crystal cell.

Furthermore, it is preferable that the above-mentioned polarizing plate is used as the polarizing plate of the front side, and it is more preferable that the above-mentioned polarizing plate is used as the polarizing plates on the front and rear sides, among the polarizing plates provided on the both sides of the liquid crystal cell.

Hereinafter, the liquid crystal cell constituting the liquid crystal display device will be described in detail.

<Liquid Crystal Cell>

The liquid crystal cell used in the liquid crystal display device is preferably in a vertical alignment (VA) mode, an optically compensated bend (OCB) mode, an in-plane-switching (IPS) mode, an fringe-field-switching (FFS) mode, or a twisted nematic (TN) mode, but is not limited to these.

In a TN-mode liquid crystal cell, rod-shaped liquid crystal molecules are substantially horizontally aligned and are twist-aligned at 60° to 120° during no voltage application thereto. A TN-mode liquid crystal cell is most often used in a color TFT liquid crystal display device and described in numerous documents.

In a VA-mode liquid crystal cell, rod-shaped liquid crystal molecules are substantially vertically aligned during no voltage application thereto. Examples of the VA-mode liquid crystal cell include (1) a VA-mode liquid crystal cell in the narrow sense of the word, in which rod-shaped liquid crystal molecules are substantially vertically aligned during no voltage application thereto, but are substantially horizontally aligned during voltage application thereto (described in JP1990-176625A (JP-H02-176625A)), (2) an MVA-mode liquid crystal cell in which the VA-mode is multi-domained for viewing angle enlargement (described in SID97, Digest of tech. Papers (preprint), 28 (1997) 845), (3) a liquid crystal cell in a mode (n-ASM mode) in which rod-shaped liquid crystal molecules are substantially vertically aligned during no voltage application thereto and are multi-domain-aligned during voltage application thereto (described in Seminar of Liquid Crystals of Japan, Papers (preprint), 58-59 (1998)), and (4) a survival-mode liquid crystal cell (announced in LCD International 98). In addition, the liquid crystal cell in the VA mode may be any of a patterned vertical alignment (PVA) type, an optical alignment type, and a polymer-sustained alignment (PSA) type. Details of these modes are specifically described in JP2006-215326A and JP2008-538819A.

In an IPS-mode liquid crystal cell, rod-shaped liquid crystal molecules are aligned substantially parallel with respect to a substrate, and application of an electric field parallel to the substrate surface causes the liquid crystal molecules to respond planarly. The IPS-mode displays black in a state where no electric field is applied and a pair of upper and lower polarizing plates have absorption axes which are orthogonal to each other. A method of improving the viewing angle by reducing light leakage during black display in an oblique direction using an optical compensation sheet is disclosed in JP1998-054982A (JP-H10-054982A), JP1999-202323A (JP-H11-202323A), JP1997-292522A (JP-109-292522A), JP1999-133408A (JP-H11-133408A), JP1999-305217A (JP-H11-305217A), JP1998-307291A (JP-H10-307291A), and the like.

[Organic EL Display Device]

Examples of the organic EL display device which is an example of the image display device include an aspect which includes, from the visible side, a polarizer, a A/4 plate (a positive A plate) including the above-mentioned optically anisotropic layer, and an organic EL display panel in this order.

Furthermore, the organic EL display panel is a display panel composed of an organic EL device in which an organic light emitting layer (organic electroluminescent layer) is sandwiched between electrodes (between a cathode and an anode). The configuration of the organic EL display panel is not particularly limited but a known configuration is adopted.

EXAMPLES

Hereinbelow, the present invention will be described in more detail with reference to Examples. The materials, the amounts of materials used, the proportions, the treatment details, and the treatment procedure shown in Examples below can be appropriately modified as long as the modifications do not depart from the spirit of the present invention. Therefore, the scope of the present invention should not be construed as being limited to Examples shown below.

Example 1

Manufacture of Protective Film 1

Preparation of Core Layer Cellulose Acylate Dope 1

The following composition was put into a mixing tank and stirred to dissolve the respective components to prepare a core layer cellulose acylate dope 1.

| Core layer cellulose acylate dope 1 | |
|---|---|
| Cellulose acetate having a degree of acetyl substitution of 2.88 | 100 parts by mass |
| The following polyester | 12 parts by mass |
| The following durability improver | 4 parts by mass |
| Methylene chloride (the first solvent) | 430 parts by mass |
| Methanol (the second solvent) | 64 parts by mass |

Polyester (number-average molecular weight of 800)

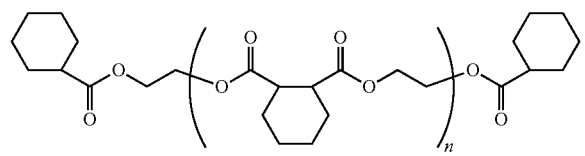

Durability Improver

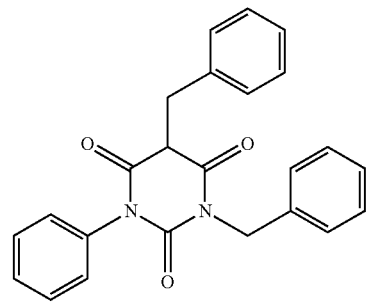 [SMILES: O=C1C(Cc2ccccc2)C(=O)N(c2ccccc2)C(=O)N1Cc1ccccc1]

Preparation of Outer Layer Cellulose Acylate Dope 1

10 parts by mass of the following matting agent dispersion liquid 1 was added to 90 parts by mass of the core layer cellulose acylate dope 1 to prepare an outer layer cellulose acylate dope 1.

| Matting agent dispersion liquid 1 | |
|---|---|
| Silica particles with an average particle size of 20 nm (AEROSIL R972, manufactured by Nippon Aerosil Co., Ltd.) | 2 parts by mass |
| Methylene chloride (the first solvent) | 76 parts by mass |
| Methanol (the second solvent) | 11 parts by mass |
| Core layer cellulose acylate dope 1 | 1 part by mass |

Manufacture of Protective Film 1

The core layer cellulose acylate dope 1 and the outer layer cellulose acylate dope 1 were filtered, using a filter paper with an average pore diameter of 34 μm and a sintered metal filter with an average pore diameter of 10 μm. Then, the core layer cellulose acylate dope 1 and the outer layer cellulose acylate dopes 1 on both sides thereof were cast simultaneously on a drum at 20° C. from a casting port in three layers, using a band casting machine.

Subsequently, the film was peeled from the drum in a state where a solvent content of the film on the drum was approximately 20% by mass. Both ends of the obtained film in the width direction were fixed with tenter clips, and the film was dried while being stretched 1.1 times in the width direction in a state where the solvent content of the film was 3% to 15% by mass.

Thereafter, the obtained film was transported between rolls of a heat treatment device and further dried to manufacture a cellulose acylate film 1 with a film thickness of 40 μm, which was used as a protective film 1. The results of measuring a phase difference of the protective film 1 were as follows: Re=1 nm and Rth=−5 nm.

Manufacture of Optically Anisotropic Layer 1

Preparation of Composition 1 for Photo-Alignment Film 8.4 parts by mass of the following copolymer C3 and 0.3 parts by mass of the following thermal acid generator D1 were added to a mixed liquid including 80 parts by mass and 20 parts by mass of butyl acetate and methyl ethyl ketone, respectively, to prepare a composition 1 for a photo-alignment film.

Copolymer C3 (weight-average molecular weight: 40,000)

Thermal Acid Generator D1

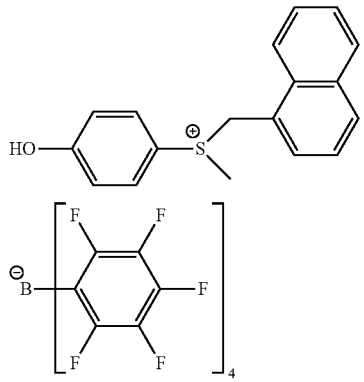

Preparation of Polymerizable Liquid Crystal Composition 1

A polymerizable liquid crystal composition 1 for forming an optically anisotropic layer having the following composition was prepared.

| Polymerizable Liquid Crystal Composition 1 | |
|---|---|
| Rod-shaped liquid crystal compound R1 | 42.00 parts by mass |
| Rod-shaped liquid crystal compound R2 | 42.00 parts by mass |
| Monofunctional compound A1 | 12.00 parts by mass |
| Liquid crystal compound T1 | 4.00 parts by mass |
| Polymerization initiator S1 | 0.50 parts by mass |
| Leveling agent P1 | 0.20 parts by mass |
| HISOLVE MTEM (manufactured by Toho Chemical Industry Co., Ltd.) | 2.00 parts by mass |
| NK Ester A-200 (manufactured by Shin Nakamura Chemical Co., Ltd.) | 1.00 part by mass |
| Methyl ethyl ketone | 424.80 parts by mass |

Furthermore, a group adjacent to the acryloyloxy group of each of the following rod-shaped liquid crystal compounds R1 and R2 represents a propylene group (a group obtained by substituting a methyl group with an ethylene group), and the following rod-shaped liquid crystal compounds R1 and R2 each represent a mixture of regioisomers having different positions of the methyl groups.

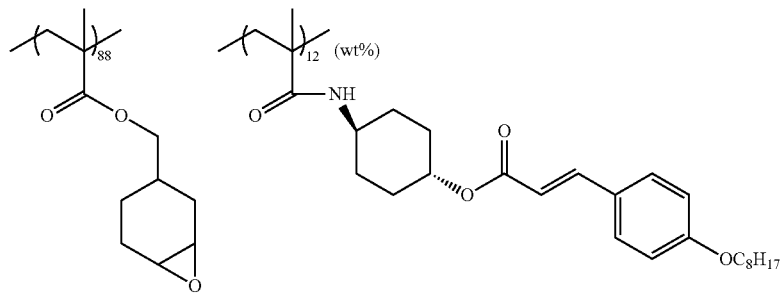

Rod-Shaped Liquid Crystal Compound R1

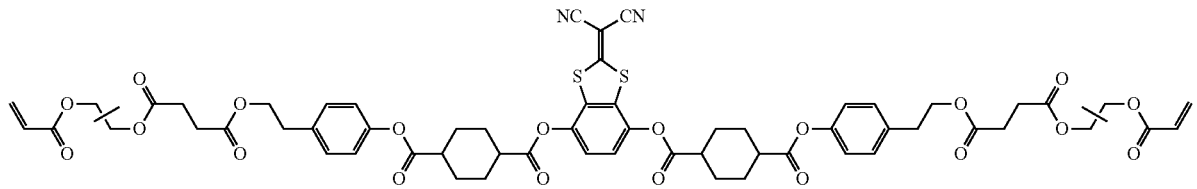

Rod-Shaped Liquid Crystal Compound R2

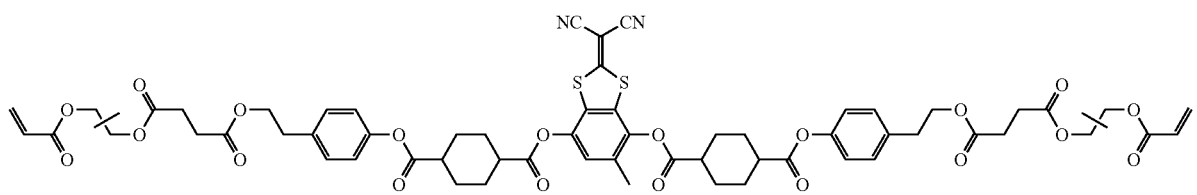

Monofunctional Compound A1

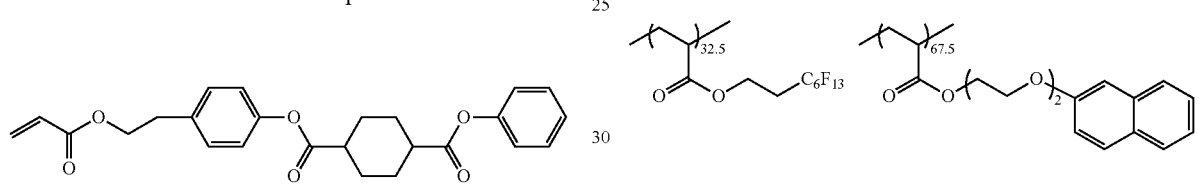

Liquid Crystal Compound T1

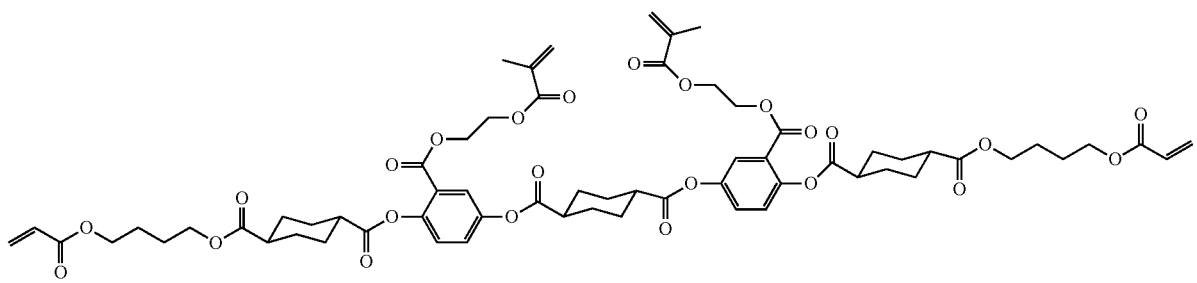 [SMILES: C=CC(=O)OCCCCOC(=O)C1CCC(C(=O)Oc2ccc(OC(=O)C3CCC(C(=O)Oc4ccc(OC(=O)C5CCC(C(=O)OCCCCOC(=O)C=C)CC5)c(C(=O)OCCOC(=O)C(=C)C)c4)CC3)cc2C(=O)OCCOC(=O)C(=C)C)CC1]

Polymerization Initiator S1

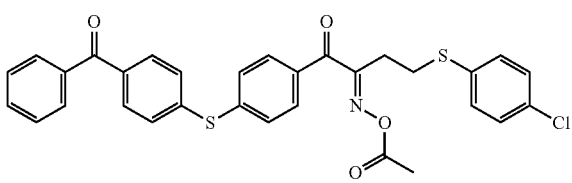 [SMILES: CC(=O)O/N=C(\CCSc1ccc(Cl)cc1)C(=O)c1ccc(Sc2ccc(C(=O)c3ccccc3)cc2)cc1]

Leveling agent P1 (in the following formula: 32.5 and 67.5 indicate contents (% by mass) of the respective repeating units with respect to all repeating units in the leveling agent P1).

Manufacture of Optically Anisotropic Layer 1

The composition 1 for the photoalignment film prepared in advance was applied onto a surface on one side of the manufactured protective film 1 using a bar coater. Then, the film was dried on a hot plate at 80° C. for 5 minutes to remove the solvent, thereby forming a photoisomerization composition layer with a thickness of 0.2 μm. The obtained photoisomerization composition layer was irradiated with polarized ultraviolet rays (10 mJ/cm² using an ultra-high-pressure mercury lamp) to form a photo-alignment film 1 with a thickness of 0.2 μm.

Subsequently, the polymerizable liquid crystal composition 1 prepared in advance was applied onto a surface of the photo-alignment film 1 with a bar coater to form a composition layer. The formed composition layer was heated on a hot plate to a temperature exhibiting an isotropic phase, and then cooled to stabilize the alignment at a temperature exhibiting a smectic phase. Thereafter, while maintaining the temperature, the alignment was immobilized by irradiation with ultraviolet rays (500 mJ/cm$^2$, using an ultra-high-pressure mercury lamp) in a nitrogen atmosphere (an oxygen concentration of 100 ppm) to form an optically anisotropic layer 1 with a thickness of 2 μm.

In a case where the obtained optically anisotropic layer 1 was peeled from the protective film 1 and a phase difference of the optically anisotropic layer 1 was measured, the in-plane retardation Re1(550) was 130 nm, Re1(450)/Re1(550) was 0.85, and the optically anisotropic layer 1 was confirmed to be a positive A plate.

[Evaluation]

<X-Ray Diffraction Measurement>

For the optically anisotropic layer 1 formed on the surface of the photo-alignment film 1, X-ray diffraction measurement was performed under the following equipment and conditions, and it was confirmed whether diffracted light derived from the order (periodic structure) of the smectic phase was observed.

As a result, in the optically anisotropic layer 1, a peak showing a periodic structure was observed at 2θ=1.8°, and diffracted light derived from the order of the smectic phase was confirmed.

(Apparatus and Conditions)

X-ray diffractometer ATXG (model name, for evaluation of a thin film structure, manufactured by Rigaku), Cu source (50 kV-300 mA), 0.45 solar slit (Evaluation Standard)

A: Diffraction peaks derived from the periodic structure of the smectic phase are observed.

B: No diffraction peak derived from the periodic structure of the smectic phase is observed.

<Contrast>

Measurement of a contrast was performed with a laminate in which a direct-type LED backlight light source, a lower polarizing plate, the manufactured optically anisotropic layer 1, and an upper polarizing plate were arranged on a table in order from the bottom so that the respective surfaces were parallel. At this time, the optically anisotropic layer 1 and the upper polarizing plate were made rotatable.

A luminance of the light emitted from the light source and transmitted through the lower polarizing plate, the optically anisotropic layer 1, and the upper polarizing plate in this order was measured from the direction perpendicular to the main surface of each polarizing plate and the optically anisotropic layer 1, using a luminance meter (BM-5A (manufactured by TOPCON)).

Measurement of the luminance was performed as follows. First, the upper polarizing plate was rotated in the absence of the optically anisotropic layer 1 and adjusted to a position where the luminance was the darkest (a state of crossed nicols). The optically anisotropic layer 1 was inserted, and the optically anisotropic layer 1 was rotated under the state of crossed nicols to measure a luminance which reached a minimum value. Next, the upper polarizing plate was rotated to arrange the upper polarizing plate and the lower polarizing plate under the state of parallel nicols, and then the optically anisotropic layer 1 was rotated under the state of parallel nicols to measure a luminance which reached a maximum value.

In order to eliminate the contribution of luminance leakage caused by the upper polarizing plate and the lower polarizing plate, a value obtained by the following expression was defined as a contrast of the optically anisotropic layer 1 and evaluated according to the following standard. The results are shown in Table 4 below.

Contrast=1/[({(Minimum luminance under crossed nicols in a case where the optically anisotropic layer 1 is arranged)/(Maximum luminance under parallel nicols in a case where the optically anisotropic layer 1 is arranged)}−{(Minimum luminance under crossed nicols in the absence of the optically anisotropic layer 1)/(Maximum luminance under parallel nicols in the absence of the optically anisotropic layer 1)}]

(Evaluation Standard)

A: The contrast is 200,000 or more
B: The contrast is 100,000 or more and less than 200,000
C: The contrast is less than 100,000

<Defects>

For the manufactured optically anisotropic layer 1, observation with a polarizing microscope and visual observation of a laminate obtained by inserting the optically anisotropic layer 1 between two polarizing plates arranged under the state of crossed nicols were each performed, and the defects of the optically anisotropic layer 1 were evaluated according to the following standard.

(Evaluation Standard)

A: By observation with the polarizing microscope, disturbance of a liquid crystal director can hardly be confirmed B: By observation with the polarizing microscope, disturbance of a liquid crystal director can be slightly confirmed, but by visual observation, defects caused by misalignment cannot be confirmed C: By observation with the polarizing microscope, disturbance of a liquid crystal director can be slightly strongly confirmed, but by visual observation, defects caused by misalignment cannot be confirmed D: By visual observation, defects caused by misalignment can be confirmed, which is unacceptable Example 2

An optically anisotropic layer 2 of Example 2 was manufactured by the same method as in Example 1, except that the following monofunctional compound A2 was used instead of the monofunctional compound A1 included in the polymerizable liquid crystal composition 1, and each evaluation was performed.

Monofunctional Compound A2

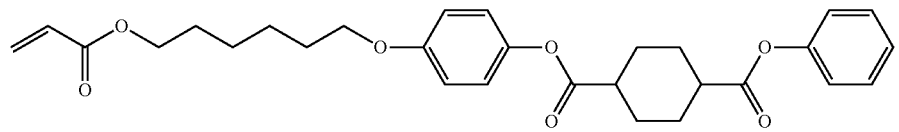 [SMILES: C=CC(=O)OCCCCCCOc1ccc(OC(=O)C2CCC(C(=O)Oc3ccccc3)CC2)cc1]

Example 3

An optically anisotropic layer 3 of Example 3 was manufactured by the same method as in Example 1, except that the following monofunctional compound A3 was used instead of the monofunctional compound A1 included in the polymerizable liquid crystal composition 1, and each evaluation was performed.

Monofunctional Compound A3

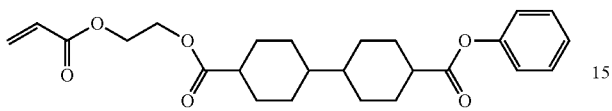

Example 4

An optically anisotropic layer 4 of Example 4 was manufactured by the same method as in Example 1, except that 84.00 parts by mass of the following rod-shaped liquid crystal compound R3 was used instead of the rod-shaped liquid crystal compounds R1 and R2 included in the polymerizable liquid crystal composition 1, and each evaluation was performed.

Rod-Shaped Liquid Crystal Compound R3

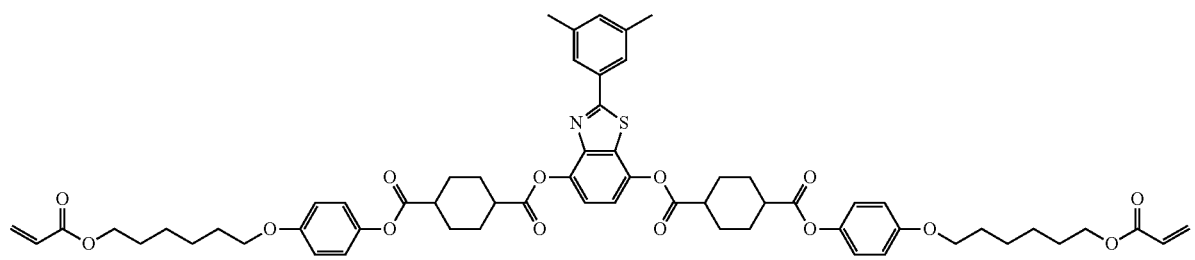 [SMILES: C=CC(=O)OCCCCCCOc1ccc(OC(=O)C2CCC(C(=O)Oc3ccc(OC(=O)C4CCC(C(=O)Oc5ccc(OCCCCCCOC(=O)C=C)cc5)CC4)c4sc(-c5cc(C)cc(C)c5)nc34)CC2)cc1]

Example 5

An optically anisotropic layer 5 of Example 5 was manufactured by the same method as in Example 1, except that the polymerizable liquid crystal composition 2 having the following composition was used instead of the polymerizable liquid crystal composition 1, and each evaluation was performed.

| Polymerizable Liquid Crystal Composition 2 | |
| --- | --- |
| Rod-shaped liquid crystal compound R4 | 20.00 parts by mass |
| Rod-shaped liquid crystal compound R5 | 40.00 parts by mass |
| Liquid crystal compound T2 | 40.00 parts by mass |
| Monotbnetional compound A3 | 15.00 parts by mass |
| Polymerization initiator S1 | 0.50 parts by mass |
| Leveling agent P1 | 0.20 parts by mass |
| Cyclopentanone | 424.8 parts by mass |

Rod-shaped liquid crystal compound R4

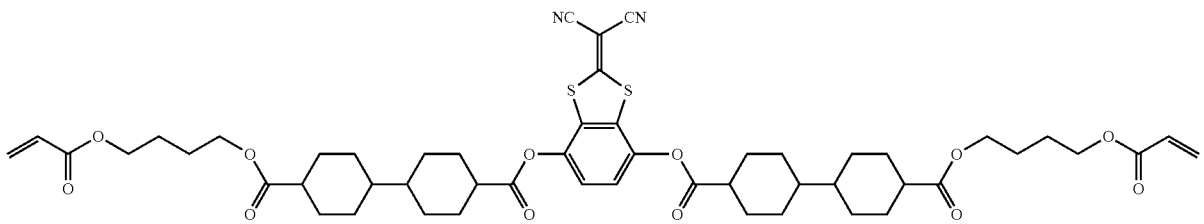 [SMILES: C=CC(=O)OCCCCOC(=O)C1CCC(C2CCC(C(=O)Oc3ccc(OC(=O)C4CCC(C5CCC(C(=O)OCCCCOC(=O)C=C)CC5)CC4)c4c3SC(=C(C#N)C#N)S4)CC2)CC1]

Rod-shaped liquid crystal compound R5

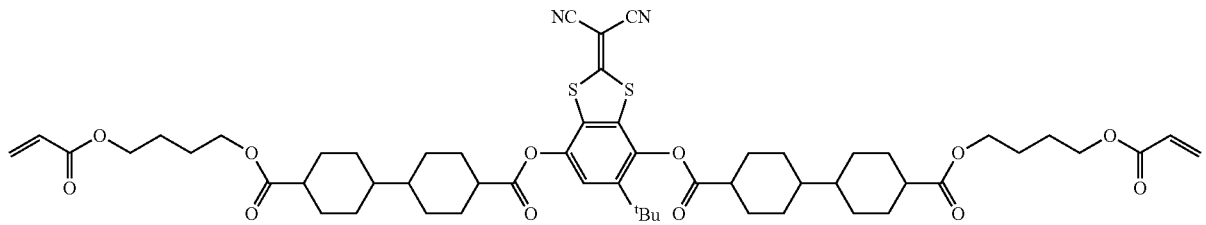 [SMILES: C=CC(=O)OCCCCOC(=O)C1CCC(C2CCC(C(=O)Oc3cc(C(C)(C)C)c(OC(=O)C4CCC(C5CCC(C(=O)OCCCCOC(=O)C=C)CC5)CC4)c4c3SC(=C(C#N)C#N)S4)CC2)CC1]

Liquid crystal compound T2

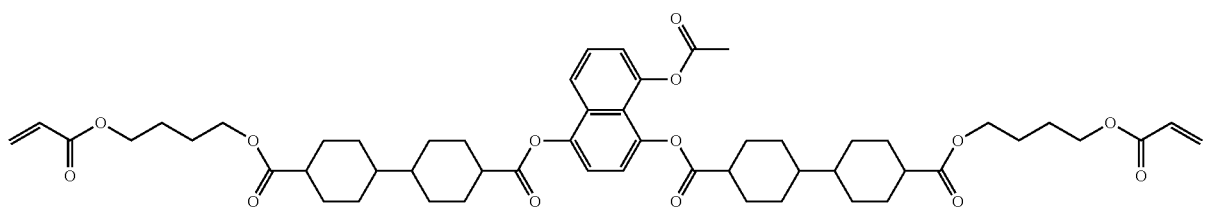 [SMILES: C=CC(=O)OCCCCOC(=O)C1CCC(C2CCC(C(=O)Oc3ccc(OC(=O)C4CCC(C5CCC(C(=O)OCCCCOC(=O)C=C)CC5)CC4)c4c(OC(C)=O)cccc34)CC2)CC1]

Example 6

An optically anisotropic layer 6 of Example 6 was manufactured by the same method as in Example 5, except that the following monofunctional compound A4 was used instead of the monofunctional compound A3 included in the polymerizable liquid crystal composition 2, and each evaluation was performed.

Monofunctional Compound A4

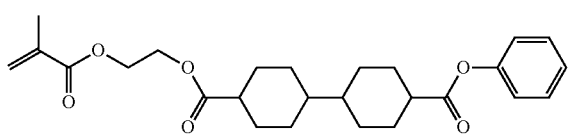

Example 7

An optically anisotropic layer 7 of Example 7 was manufactured by the same method as in Example 1, except that the following monofunctional compound A9 was used instead of the monofunctional compound A1 included in the polymerizable liquid crystal composition 1, and each evaluation was performed.

Monofunctional Compound A9

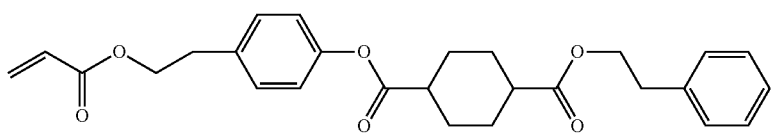

Comparative Example 1

An optically anisotropic layer C1 of Comparative Example 1 was manufactured by the same method as in Example 1, except that the monofunctional compound A1 was removed from the polymerizable liquid crystal composition 1, and each evaluation was performed.

Comparative Example 2

An optically anisotropic layer C2 of Comparative Example 2 was manufactured by the same method as in Example 1, except that in the manufacture of the optically anisotropic layer 1, the alignment of the composition layer formed by applying the polymerizable liquid crystal composition 1 was stabilized at a temperature exhibiting a nematic phase, and then the alignment was immobilized by irradiation with ultraviolet rays, and each evaluation was performed.

Comparative Example 3

An optically anisotropic layer C3 of Comparative Example 3 was manufactured by the same method as in Example 1, except that the following monofunctional compound A5 was used instead of the monofunctional compound A1 included in the polymerizable liquid crystal composition 1, and each evaluation was performed.

Monofunctional Compound A5

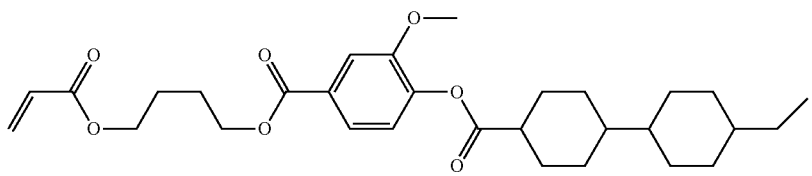 [SMILES: C=CC(=O)OCCCCOC(=O)c1ccc(OC(=O)C2CCC(C3CCC(CC)CC3)CC2)c(OC)c1]

Comparative Example 4

An optically anisotropic layer C4 of Comparative Example 4 was manufactured by the same method as in Example 1, except that the following monofunctional compound A6 was used instead of the monofunctional compound A1 included in the polymerizable liquid crystal composition 1, and each evaluation was performed.

Monofunctional Compound A6

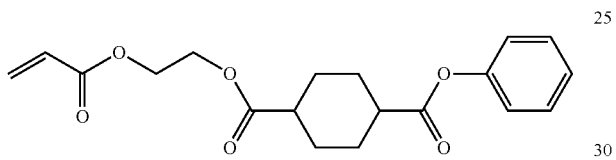

Comparative Example 5

An optically anisotropic layer C5 of Comparative Example 5 was manufactured by the same method as in Example 1, except that the following compound A7 having no polymerizable group was used instead of the monofunctional compound A1 of the polymerizable liquid crystal composition 1, and each evaluation was performed.

Compound A7

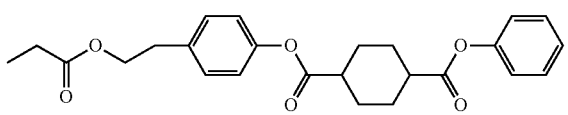

Comparative Example 6

An optically anisotropic layer C6 of Comparative Example 6 was manufactured by the same method as in Example 4, except that the monofunctional compound A1 was removed from the polymerizable liquid crystal composition of Example 4, and each evaluation was performed.

Comparative Example 7

An optically anisotropic layer C7 of Comparative Example 7 was manufactured by the same method as in Example 5, except that the following monofunctional compound A8 was used instead of the monofunctional compound A3 included in the polymerizable liquid crystal composition 2 of Example 5, and each evaluation was performed.

Monofunctional Compound A8

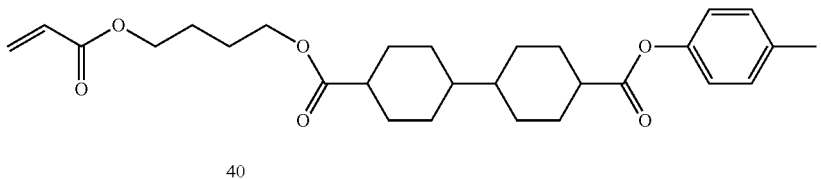

Evaluation Results

The composition of the polymerizable liquid crystal composition used for forming the optically anisotropic layer in each of Examples 1 to 7 and Comparative Examples 1 to 7, and the evaluation results of the X-ray diffraction measurement, the contrast, and the defects of an optically anisotropic layer thus formed are each shown in Table 4 below.

In Table 4, the "Ratio $a_2/a_1$" column shows a ratio of the number $a_2$ of atoms of the monofunctional compound to the number $a_1$ of atoms of the rod-shaped liquid crystal compound in each Example and each Comparative Example.

In addition, in each Example and each Comparative Example, a case where the number $b_1$ of the rings $B^1$ contained in the rod-shaped liquid crystal compound and the total number $b_2$ of the rings $B^2$ and the aromatic rings Ar contained in the monofunctional compound satisfy a relationship of Expression (2) is notated as "A" in the "Expression (2)" column of Table 4, and a case where the numbers do not satisfy the relationship of Expression (2) is notated as "B" in the same column.

Furthermore, in a case where the phase differences of the optically anisotropic layers 2 to 7 formed in Examples 2 to 7 were measured in the same manner as in Example 1, the in-plane retardation Re1(550) was 110 to 150 nm, Re1(450)/Re1(550) was 0.70 to 0.98, and all of the optically anisotropic layers were positive A plates.

TABLE 4

Composition of polymerizable liquid crystal composition

| | Rod-shaped liquid crystal compound | | | Monofunctional compound | | | | | Evaluation | | |
|---|---|---|---|---|---|---|---|---|---|---|---|
| | Type | Number $a_1$ of atoms | Number $b_1$ of rings | Type | Number $a_2$ of atoms | Number $b_2$ of rings | Ratio $a_2/a_1$ | Expression (2) | X-ray diffraction measurement | Contrast | Defects |
| Example 1 | R1 | 56 | 5 | A1 | 22 | 3 | 0.39 | A | A | A | A |
| | R2 | 56 | 5 | | | | 0.39 | | | | |
| Example 2 | R1 | 56 | 5 | A2 | 27 | 3 | 0.48 | A | A | A | A |
| | R2 | 56 | 5 | | | | 0.48 | | | | |
| Example 3 | R1 | 56 | 5 | A3 | 22 | 3 | 0.39 | A | A | B | C |
| | R2 | 56 | 5 | | | | 0.39 | | | | |
| Example 4 | R3 | 50 | 5 | A1 | 22 | 3 | 0.44 | A | A | A | A |
| Example 5 | R4 | 44 | 5 | A3 | 22 | 3 | 0.50 | A | A | A | A |
| | R5 | 44 | 5 | | | | 0.50 | | | | |
| Example 6 | R4 | 44 | 5 | A4 | 22 | 3 | 0.50 | A | A | A | A |
| | R5 | 44 | 5 | | | | 0.50 | | | | |
| Example 7 | R1 | 56 | 5 | A9 | 24 | 3 | 0.43 | A | A | B | B |
| | R2 | 56 | 5 | | | | 0.43 | | | | |
| Comparative Example 1 | R1 | 56 | 5 | — | — | — | — | — | A | C | D |
| | R2 | 56 | 5 | | | | | | | | |
| Comparative Example 2 | R1 | 56 | 5 | A1 | 22 | 3 | 0.39 | A | B | C | C |
| | R2 | 56 | 5 | | | | 0.39 | | | | |
| Comparative Example 3 | R1 | 56 | 5 | A5 | 26 | 3 | 0.46 | A | A | C | C |
| | R2 | 56 | 5 | | | | 0.46 | | | | |
| Comparative Example 4 | R1 | 56 | 5 | A6 | 18 | 2 | 0.32 | B | A | C | C |
| | R2 | 56 | 5 | | | | 0.32 | | | | |
| Comparative Example 5 | R1 | 56 | 5 | A7 | 22 | 3 | 0.39 | A | A | C | D |
| | R2 | 56 | 5 | | | | 0.39 | | | | |
| Comparative Example 6 | R3 | 50 | 5 | — | — | — | — | — | A | C | D |
| Comparative Example 7 | R4 | 44 | 5 | A8 | 25 | 3 | 0.57 | A | A | C | D |
| | R5 | 44 | 5 | | | | 0.57 | | | | |

From the results shown in Table 4 above, it was found that in a case where an optically anisotropic layer was formed using a polymerizable liquid crystal composition containing no monofunctional compound, the contrast of an image display device was deteriorated (Comparative Example 1 and Comparative Example 6).

Furthermore, it was found that in a case where the optically anisotropic layer does not show a diffraction peak derived from the periodic structure in the X-ray diffraction measurement, the contrast of an image display device is deteriorated (Comparative Example 2).

Moreover, even with the polymerizable liquid crystal composition including a monofunctional compound, it was found that in a case where a monofunctional compound has no aromatic ring which may have a substituent at a terminal (Comparative Example 3) or the monofunctional compound has no polymerizable group that is polymerizable with a rod-shaped liquid crystal compound (Comparative Example 5), the contrast of an image display device was deteriorated.

Furthermore, even with the polymerizable liquid crystal composition including a monofunctional compound, it was found that in a case where a ratio of the number $b_1$ of the rings B1 of the rod-shaped liquid crystal compound to the number $b_2$ of the rings $B^2$ of the monofunctional compound does not satisfy a relationship of Expression (2), the contrast of an image display device is deteriorated (Comparative Example 4).

In addition, even with the polymerizable liquid crystal composition including a monofunctional compound, it was found that in a case where ratio of the number $a_2$ of atoms of the monofunctional compound to the number $a_1$ of atoms of the rod-shaped liquid crystal compound does not satisfy a relationship of Expression (1), the contrast of an image display device is deteriorated (Comparative Example 7).

In contrast, it was found that in a case where the polymerizable liquid crystal composition includes a monofunctional compound having a specific polymerizable group and an aromatic ring group, and the rod-shaped liquid crystal compound and the monofunctional compound included in the polymerizable liquid crystal composition satisfy both of Expression (1) and Expression (2), by forming an optically anisotropic layer using the polymerizable liquid crystal composition, the contrast of an image display device thus obtained is good (Examples 1 to 7).

In particular, it was confirmed that in a case where the array of the rings consisting of the rings $B^2$ and the rings Ar arranged in order from the polymerizable group in the monofunctional compound is the same as the array of the rings $B^1$ in the rod-shaped liquid crystal compound, an effect of suppressing defects in the optically anisotropic layer is good (comparison between Example 7 and Example 3).

In addition, it was confirmed that in a case where the structure of the portion W2 in the monofunctional compound is the same as the structure of the portion W1 in the rod-shaped liquid crystal compound, the contrast of an image display device thus obtained is better and an effect of suppressing defects in the optically anisotropic layer is good (comparison between Example 1 and Example 7).

EXPLANATION OF REFERENCES

10: optical film
12: optically anisotropic layer
14: alignment film
16: support

What is claimed is:

1. An optically anisotropic layer obtained by curing a polymerizable liquid crystal composition including a rod-shaped liquid crystal compound having reverse wavelength dispersibility and a monofunctional compound, in an alignment state of the rod-shaped liquid crystal compound,
wherein the rod-shaped liquid crystal compound is a compound represented by Formula (I),

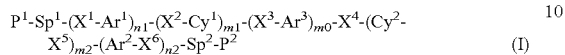

(I)

in Formula (I),
$P^1$ and $P^2$ each independently represent an acryloyloxy group or a methacryloyloxy group,
wherein $P^1$ includes a first terminal atom and $P^2$ includes a second terminal atom of the rod-shaped liquid crystal compound represented by Formula (I), wherein the first terminal atom of the rod-shaped liquid crystal compound is a starting atom and the second terminal atom of the rod-shaped liquid crystal compound represented by Formula (I) is an ending atom utilized to calculate a maximum number of atoms linked together at a shortest distance to form the rod-shaped liquid crystal compound represented by Formula (I), wherein the maximum number of atoms linked together at a shortest distance to form the rod-shaped liquid crystal compound represented by Formula (I) is counted such that the starting atom and the ending atom are also counted;
$Sp^1$ and $Sp^2$ each independently represent a single bond, a linear alkylene group having 1 to 14 carbon atoms, a branched alkylene group having 3 to 14 carbon atoms, or a divalent linking group in which one or more of —$CH_2$-'s constituting the linear alkylene group or the branched alkylene group are substituted with —O—, —S—, —NH—, —N(Q)-, or —CO—, where Q represents a substituent,
n1, m1, m2, and n2 represent an integer from 0 to 2, provided that at least one of m1 or n1 represents 1 or more, and at least one of m2 or n2 represents 1 or more,
m0 represents 1 or 2,
$X^1$, $X^2$, $X^3$, $X^4$, $X^5$, and $X^6$ each independently represent a single bond; or —CO—, —O—, —S—, —C(=S)—, —$CR^1R^2$—, —$CR^3$-$CR^4$—, —$NR^5$—, or a divalent linking group consisting of a combination of two or more of these groups, where $R^1$ to $R^5$ each independently represent a hydrogen atom, a fluorine atom, or an alkyl group having 1 to 12 carbon atoms, provided that in a case where n1 is 2, a plurality of $X^1$'s may be the same as or different from each other; in a case where m1 is 2, a plurality of $X^2$'s may be the same as or different from each other; in a case where m2 is 2, a plurality of $X^5$'s may be the same as or different from each other; and in a case where n2 is 2, a plurality of $X^6$'s may be the same as or different from each other,
$Ar^1$ and $Ar^2$ each independently represent an aromatic ring which may have a substituent, provided that in a case where n1 is 2, a plurality of $Ar^1$'s may be the same as or different from each other; and in a case where n2 is 2, a plurality of $Ar^2$'s may be the same as or different from each other,
$Cy^1$ and $Cy^2$ each independently represent an alicyclic ring which may have a substituent, provided that in a case where m1 is 2, a plurality of $Cy^1$'s may be the same as or different from each other; and in a case where m2 is 2, a plurality of $Cy^2$'s may be the same as or different from each other, and $Ar^3$ represents any of aromatic rings selected from the group consisting of groups represented by Formulae (Ar-1) to (Ar-7),

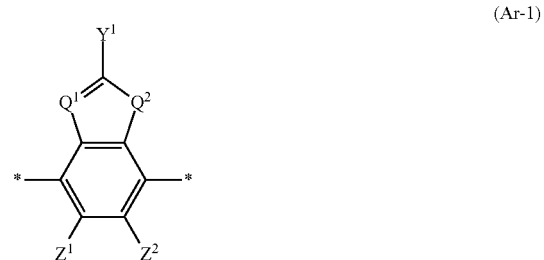

(Ar-1)

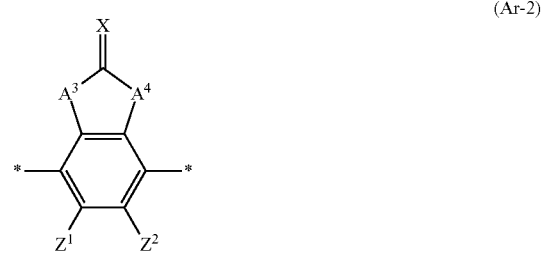

(Ar-2)

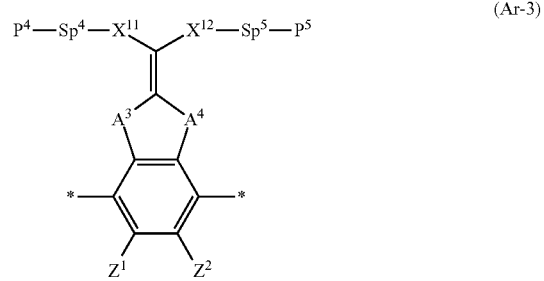

(Ar-3)

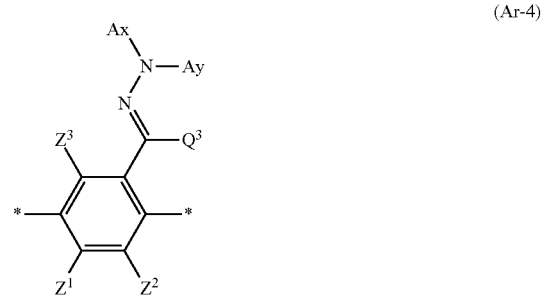

(Ar-4)

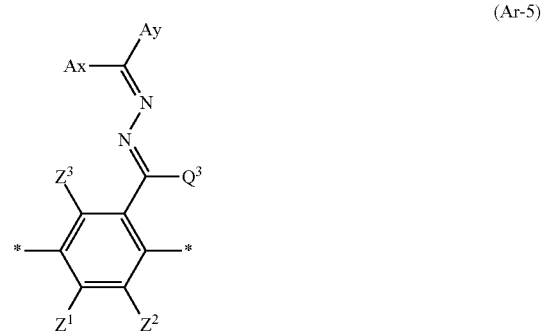

(Ar-5)

-continued

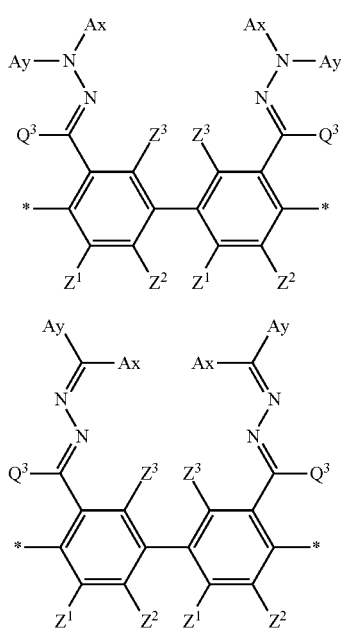

in Formulae (Ar-1) to (Ar-7), in a case where m0 represents 1, one of two * represents a bonding position to $X^3$, and the other represents a bonding position to $X^4$; in a case where m0 represents 2 and $Ar^3$ exists between two $X^3$s, two * represent a bonding position to $X^3$, respectively; in a case where m0 represents 2 and $Ar^3$ exists between $X^3$ and $X^4$, one of two * represents a bonding position to $X^3$, and the other represents a bonding position to $X^4$, $Q^1$ represents N or CH, $Q^2$ represents —S—, —O—, or —N($R^6$)—, where $R^6$ represents a hydrogen atom or an alkyl group having 1 to 6 carbon atoms, $Y^1$ represents an aromatic hydrocarbon ring having 6 to 12 carbon atoms, which may have a substituent, an aromatic heterocyclic group having 3 to 12 carbon atoms, which may have a substituent, or an alicyclic hydrocarbon group having 6 to 20 carbon atoms, which may have a substituent, and one or more of —$CH_2$-'s constituting the alicyclic hydrocarbon group may be substituted with —O—, —S—, or —NH—, $Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a monovalent aromatic heterocyclic group having 3 to 20 carbon atoms, a halogen atom, a cyano group, a nitro group, —$OR^7$, —$NR^8R^9$, —$SR^{10}$, —$COOR^{11}$, or —$COR^{12}$, $R^7$ to $R^{12}$ each independently represent a hydrogen atom or an alkyl group having 1 to 6 carbon atoms, and $Z^1$ and $Z^2$ may be bonded to each other to form an aromatic ring, $A^3$ and $A^4$ each independently represent a group selected from the group consisting of —O—, —N($R^{13}$)—, —S—, and —CO—, where $R^{13}$ represents a hydrogen atom or a substituent, X represents a non-metal atom of Groups XIV to XVI, to which a hydrogen atom or a substituent may be bonded, $X^{11}$ and $X^{12}$ each independently represent a single bond; or —CO—, —O—, —S—, —C(=S)—, —$CR^1R^2$—, —$CR^3$-$CR^4$—, —$NR^5$—, or a divalent linking group consisting of a combination of two or more of these groups, where $R^1$ to $R^5$ each independently represent a hydrogen atom, a fluorine atom, or an alkyl group having 1 to 12 carbon atoms, $Sp^4$ and $Sp^5$ each independently represent a single bond, a linear alkylene group having 1 to 14 carbon atoms, a branched alkylene group having 3 to 14 carbon atoms, or a divalent linking group in which one or more of —$CH_2$-'s constituting the linear alkylene group or the branched alkylene group are substituted with —O—, —S—, —NH—, —N(Q)-, or —CO—, where Q represents a substituent, $P^4$ and $P^5$ each independently represent a monovalent organic group, and at least one of $P^4$ or $P^5$ represents a polymerizable group, Ax represents at least one aromatic ring selected from the group consisting of an aromatic hydrocarbon ring and an aromatic heterocyclic ring, Ay represents a hydrogen atom, an alkyl group which may have a substituent, or at least one aromatic ring selected from the group consisting of an aromatic hydrocarbon ring and an aromatic heterocyclic ring, the aromatic ring in each of Ax and Ay may have a substituent, and Ax and Ay may be bonded to each other to form a ring, and $Q^3$ represents a hydrogen atom or an alkyl group having 1 to 6 carbon atoms, which may have a substituent, wherein the monofunctional compound is a compound represented by Formula (II),

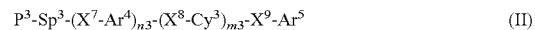

in Formula (II), $P^3$ represents an acryloyloxy group or a methacryloyloxy group, wherein $P^3$ includes a first terminal atom and $Ar^5$ includes a second terminal atom of the monofunctional compound represented by Formula (II), wherein the first terminal atom of the monofunctional compound represented by Formula (II) is a starting atom and the second terminal atom of the monofunctional compound represented by Formula (II) is an ending atom utilized to calculate a maximum number of atoms linked together at a shortest distance to form the monofunctional compound represented by Formula (II), wherein the maximum number of atoms linked together at a shortest distance to form the monofunctional compound represented by Formula (II) is counted such that the first terminal atom and the second terminal atom are also counted;

$Sp^3$ represents a single bond, a linear alkylene group having 1 to 14 carbon atoms, a branched alkylene group having 3 to 14 carbon atoms, or a divalent linking group in which one or more of —$CH_2$-'s constituting the linear alkylene group or the branched alkylene group are substituted with —O—, —S—, —NH—, —N(Q)-, or —CO—, where Q represents a substituent, n3 represents an integer from 0 to 2, and m3 represents 1 or 2, $X^7$, $X^8$, and $X^9$ each independently represent a single bond; or —CO—, —O—, —S—, —C(=S)—, —$CR^1R^2$—, —$CR^3$=$CR^4$—, —$NR^5$—, or a divalent linking group consisting of a combination of two or more of these groups, where $R^1$ to $R^5$ each independently represent a hydrogen atom, a fluorine atom, or an alkyl group having 1 to 12 carbon atoms, provided that in a case where n3 is 2, a plurality of $X^7$'s may be the same as or different from each other; and in a case where m3 is 2, a plurality of $X^8$'s may be the same as or different from each other, $Ar^4$ represents an aromatic ring which may have a substituent, provided that in a case where n3 is 2, a plurality of $Ar^4$'s may be the same as or different from each other, $Ar^5$ represents a benzene ring which does not have a substituent, and $Cy^3$ represents an alicyclic ring which may have a substituent, provided that in a case where m3 is 2, a plurality of $Cy^3$'s may be the same as or different from each other, wherein the rod-shaped liquid crystal compound and the monofunctional compound satisfy a relationship of Expression (1), and satisfy a relationship of Expression (2), and wherein the optically anisotropic layer exhibits a smectic phase, $$0.2 < a_2/a_1 < 0.55 \qquad \text{Expression (1)}$$

$$b_2 = b_1 \times 0.5 \text{ or } b_2 = (b_1 + 1) \times 0.5, \qquad \text{Expression (2)}$$

wherein in Expression (1) $a_1$ is the maximum number of atoms linked together between the starting atom and the ending atom at the shortest distance to form the rod-shaped liquid crystal compound represented by Formula (I), counted such that the starting atom and the ending atom are also counted; and $a_2$ is the maximum number of atoms linked together between the starting atom and the ending atom at the shortest distance to form the monofunctional compound represented by Formula (II), counted such that the starting atom and the ending atom are also counted, and wherein in Expression (2), $b_1$ is the number of substituted and unsubstituted aromatic rings present in $(X^1-Ar^1)_{n1}$, $(X^3-Ar^3)_{m0}$, and $(Ar^2-X^6)_{n2}$, and the number of substituted and unsubstituted alicyclic rings present in $(X^2-Cy^1)_{m1}$, and $(Cy^2-X^5)_{m2}$ of Formula (I); and $b_2$ is the number of substituted and unsubstituted aromatic rings present in $(X^7-Ar^4)_{n3}$, and $Ar^5$, and the number of substituted and unsubstituted alicyclic rings present in $(X^8-Cy^3)_{m3}$ of Formula (II).

2. The optically anisotropic layer according to claim 1, wherein both of n3 and m3 in Formula (II) are the same as both n1 and m1 in Formula (I), respectively, or the same as n2 and m2 in Formula (I), respectively.

3. The optically anisotropic layer according to claim 1, comprising at least one of the following:

i) both of n1 and n3 represent 2, and the partial structure represented by "$Ar^1-(X^1-Ar^1)-(X^2-Cy^1)_{m1}-X^3$" in Formula (I) is the same as the partial structure represented by "$Ar^4-(X^7-Ar^4)-(X^8-Cy^3)_{m3}-X^9$" in Formula (II);

ii) wherein both of n1 and n3 represent 1, and the partial structure represented by "$Ar^1-(X^2-Cy^1)_{m1}-X^3$" in Formula (I) is the same as the partial structure represented by "$Ar^4-(X^8-Cy^3)_{m3}-X^9$" in Formula (II);

iii) wherein both of n1 and n3 represent 0, both of m1 and m3 represent 2, and the partial structure represented by "$Cy^1-(X^2-Cy^1)-X^3$" in Formula (I) is the same as the partial structure represented by "$Cy^3-(X^8-Cy^3)-X^9$" in Formula (II);

iv) wherein both of n1 and n3 represent 0, both of m1 and m3 represent 1, and the partial structure represented by "$Cy^1-X^3$" in Formula (I) is the same as the partial structure represented by "$Cy^3-X^9$" in Formula (II);

v) wherein both of n2 and n3 represent 2, and the partial structure represented by "$X^4-(Cy^2-X^5)_{m2}-(Ar^2-X^6)-Ar^2$" in Formula (I) is the same as the partial structure represented by "$Ar^4-(X^7-Ar^4)-(X^8-Cy^3)_{m3}-X^9$" in Formula (II);

vi) wherein both of n2 and n3 represent 1, and the partial structure represented by "$X^4-(Cy^2-X^5)_{m2}-Ar^2$" in Formula (I) is the same as the partial structure represented by "$Ar^4-(X^8-Cy^3)_{m3}-X^9$" in Formula (II);

vii) wherein both of n2 and n3 represent 0, both of m2 and m3 represent 2, and the partial structure represented by "$X^4-(Cy^2-X^5)-Cy^2$" in Formula (I) is the same as the partial structure represented by "$Cy^3-(X^8-Cy^3)-X^9$" in Formula (II); or viii) wherein both of n2 and n3 represent 0, both of m2 and m3 represent 1, and the partial structure represented by "$X^4-Cy^2$" in Formula (I) is the same as the partial structure represented by "$Cy^3-X^9$" in Formula (II).

4. The optically anisotropic layer according to claim 1, wherein m0 represents 1 and a sum of n1, m1, m2, and n2 is 4; or m0 represents 2 and a sum of n1, m1, m2, and n2 is 3 in Formula (I).

5. The optically anisotropic layer according to claim 1, wherein a sum of n3 and m3 is 2 in Formula (II).

6. The optically anisotropic layer according to claim 1, wherein all of n1, m1, m2, and n2 are 1 in Formula (I).

7. The optically anisotropic layer according to claim 1, wherein in Formula (I), both of n1 and n2 are 0, and both of m1 and m2 are 2.

8. The optically anisotropic layer according to claim 1, wherein at least one of the alicyclic rings Cy1 and $Cy^2$ in Formula (I) is 1,4-cyclohexylene group.

9. The optically anisotropic layer according to claim 1, wherein at least one of the alicyclic rings $Cy^3$ in Formula (II) is 1,4-cyclohexylene group.

10. The optically anisotropic layer according to claim 1, wherein the optically anisotropic layer has one surface and another surface, and wherein the rod-shaped liquid crystal compound is in a state of being horizontally aligned with respect to the one surface of the optically anisotropic layer.

11. The optically anisotropic layer according to claim 1, wherein the optically anisotropic layer is a positive A plate.

12. An optical film comprising the optically anisotropic layer according to claim 1.

13. The optical film according to claim 12, wherein the optically anisotropic layer is formed on a surface of a photo-alignment film.

14. A polarizing plate comprising:
the optical film according to claim 12; and
a polarizer.

15. An image display device comprising the optical film according to claim 12.

16. The image display device according to claim 15, wherein the image display device is a liquid crystal display device.

17. The image display device according to claim 15, wherein the image display device is an organic EL display device.

* * * * *